(12) United States Patent
Wen

(10) Patent No.: US 12,522,444 B2
(45) Date of Patent: Jan. 13, 2026

(54) VEHICLE SERVICING APPARATUS AND METHODS OF USE THEREOF

(71) Applicant: Hongbin Wen, Mississauga (CA)

(72) Inventor: Hongbin Wen, Mississauga (CA)

(73) Assignee: Hongbin Wen, Mississauga (CA)

( * ) Notice: Subject to any disclaimer, the term of this patent is extended or adjusted under 35 U.S.C. 154(b) by 1080 days.

(21) Appl. No.: 17/152,691

(22) Filed: Jan. 19, 2021

(65) Prior Publication Data

US 2021/0221457 A1 Jul. 22, 2021

Related U.S. Application Data

(60) Provisional application No. 62/963,126, filed on Jan. 19, 2020.

(51) Int. Cl.
| | |
|---|---|
| *B65G 47/244* | (2006.01) |
| *B25J 5/00* | (2006.01) |
| *B25J 5/02* | (2006.01) |
| *B25J 9/00* | (2006.01) |
| *B25J 15/00* | (2006.01) |
| *B62D 65/02* | (2006.01) |
| *B65G 47/04* | (2006.01) |
| *B65G 47/90* | (2006.01) |
| *B65G 61/00* | (2006.01) |

(52) U.S. Cl.
CPC ............ *B65G 47/244* (2013.01); *B25J 5/007* (2013.01); *B25J 5/02* (2013.01); *B25J 9/0093* (2013.01); *B25J 15/0028* (2013.01); *B65G 47/04* (2013.01); *B65G 47/907* (2013.01); *B65G 61/00* (2013.01); *B62D 65/022* (2013.01)

(58) Field of Classification Search
CPC ........ B65G 47/244; B65G 47/04; B65G 1/00; B65G 61/00; B25J 5/02; B25J 5/007; B25J 9/0093; B62D 65/022; B62D 65/12
See application file for complete search history.

(56) References Cited

U.S. PATENT DOCUMENTS

2015/0047184 A1* 2/2015 Bellezza ................ B62D 65/18
29/791

* cited by examiner

*Primary Examiner* — Christopher J. Besler

(57) ABSTRACT

Apparatus for use in robotic servicing of a vehicle has a frame defining a bay for receiving a laterally positioned vehicle and a hallway longitudinally adjacent the bay, the hallway accommodating a mobile robotic servicing sub-system. A wheeled chassis underlies and supports the frame with the top of the chassis providing a floor of the bay and the hallway. A deck is located above the bay and an automated robotic system is used to pick the component from the deck, move a component along the frame, and to lower the component into the hallway for release to and pickup by the mobile robotic servicing sub-system to enable servicing with the component of the vehicle by the mobile robotic servicing sub-system.

22 Claims, 18 Drawing Sheets

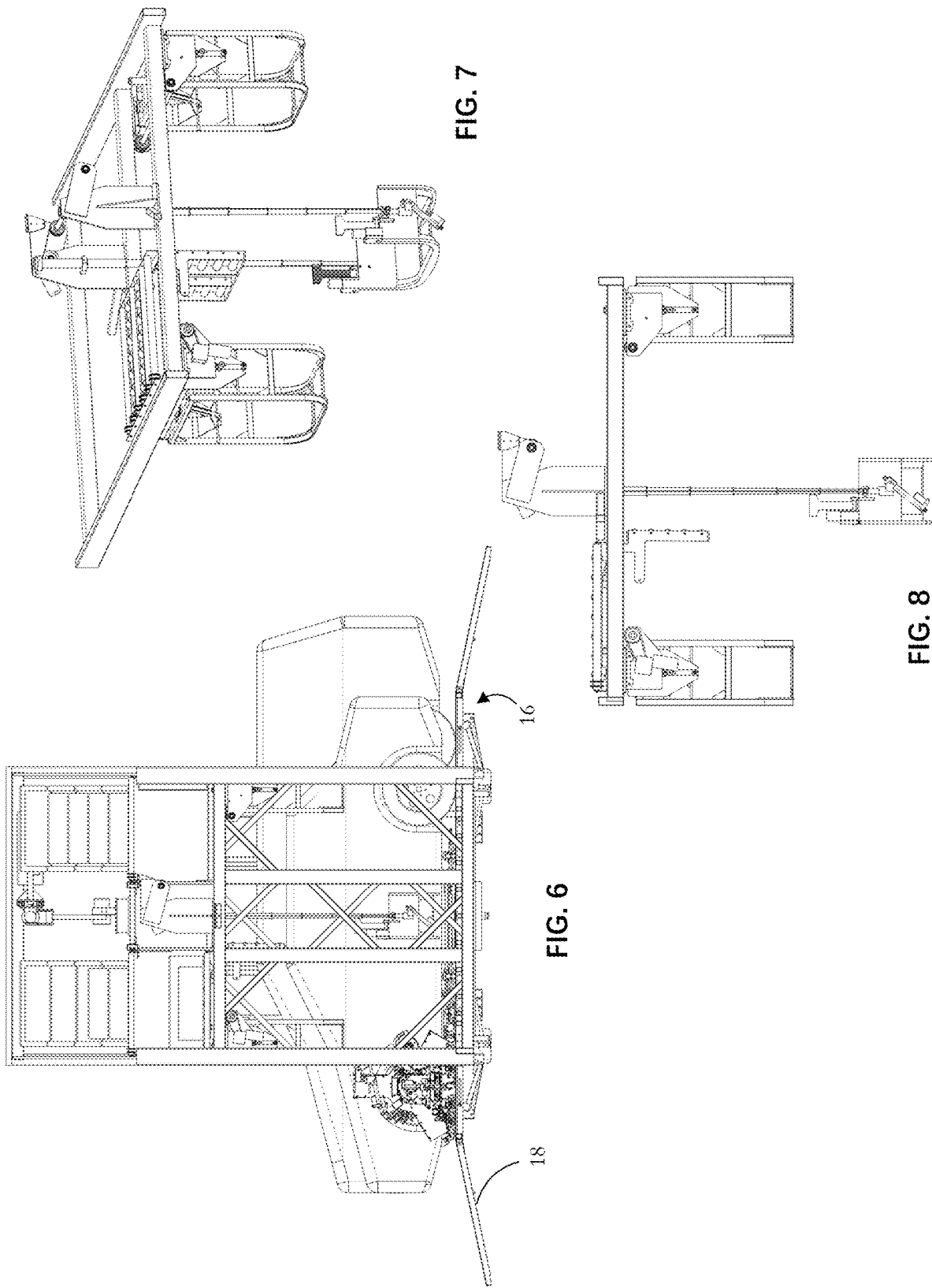

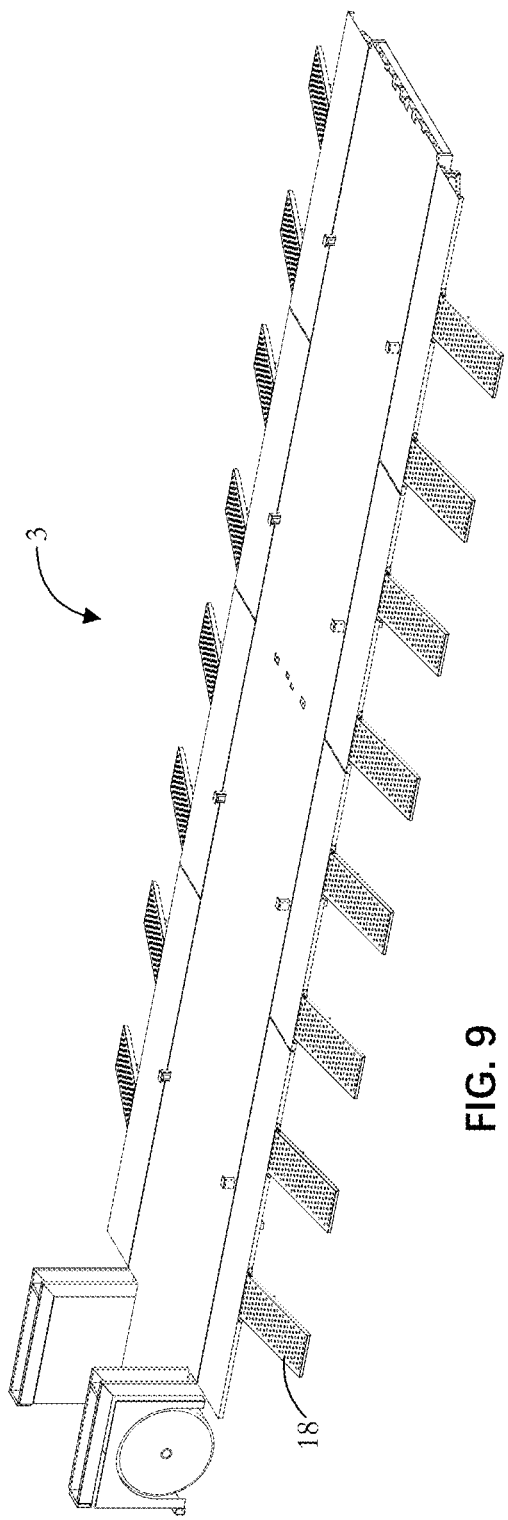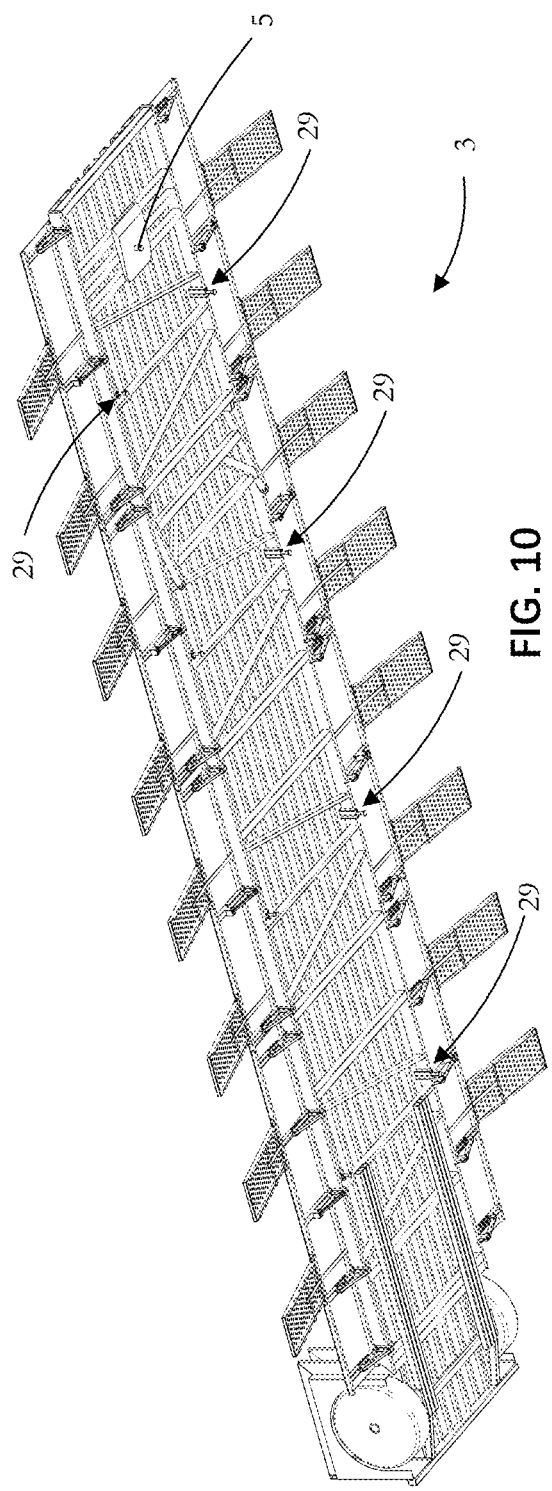
FIG. 9
FIG. 10

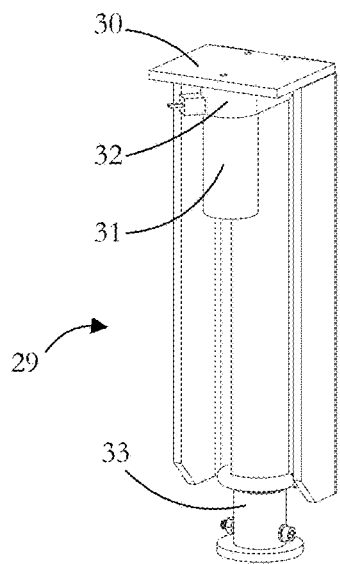
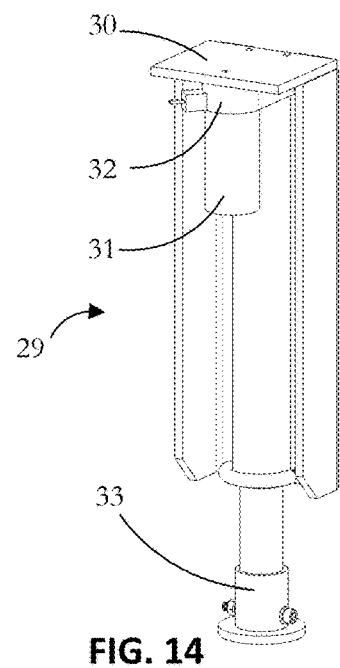
FIG. 13    FIG. 14
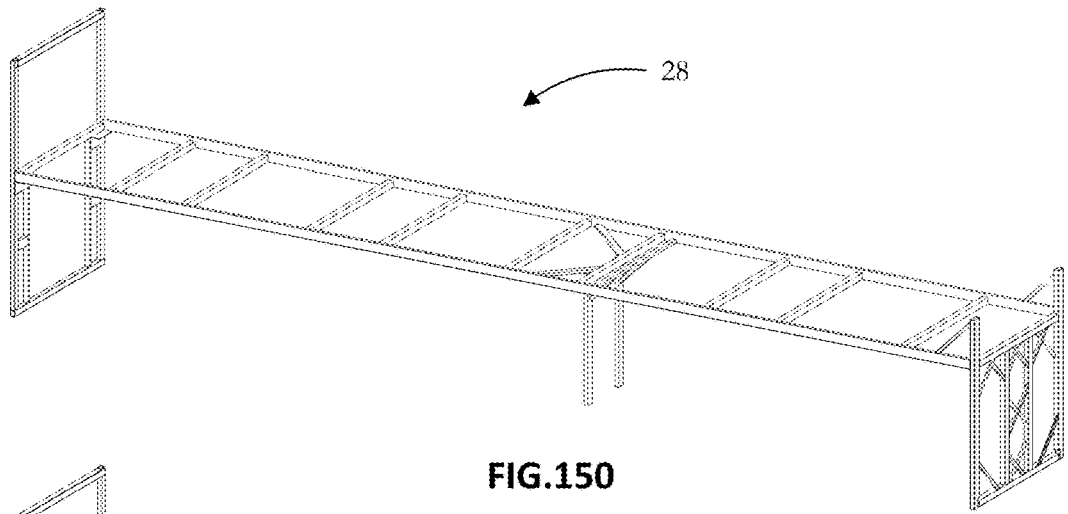
FIG. 150
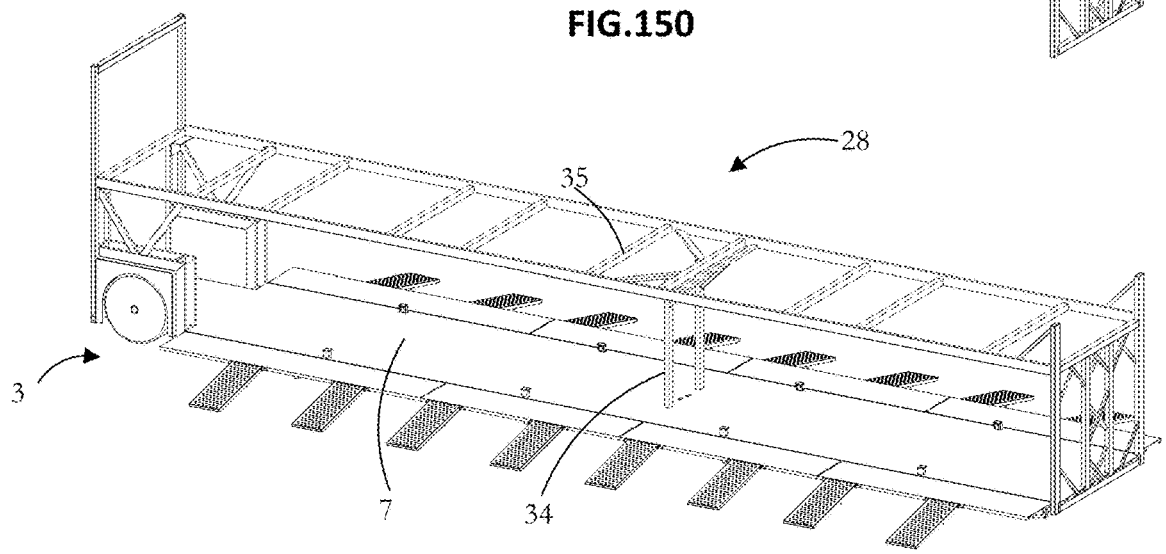
FIG. 15

VEHICLE SERVICING APPARATUS AND METHODS OF USE THEREOF

CROSS-REFERENCE TO RELATED APPLICATION

This application claims priority from U.S. provisional patent application No. 62/963,126, filed Jan. 19, 2020, the contents of which is incorporated herein by reference.

FIELD OF THE INVENTION

This invention relates to vehicle servicing apparatus and to methods of servicing vehicles.

BACKGROUND

Road vehicles such as automobiles are complex electromechanical products requiring regular maintenance and repair to keep them in a safe and workable condition. Such maintenance and repair are currently performed manually by mechanics in operations which can be costly and inefficient. This is perhaps reasonable under currently prevailing modes of vehicle use and ownership.

Recent developments in autonomous driving technology will almost inevitably bring about a change modes of vehicle business. It is likely that many car rental companies will emerge having large fleets of unmanned vehicles. Such a rental company might be expected to have 100,000 or more driverless vehicles with an operating strategy to site tens of thousands of such vehicles in a densely populated city. Rather than owning a car, individuals will rent a vehicle from a rental company for a desired period of time. They will not be directly responsible for costs such as servicing, parking and insurance. In this new regimen, efficient and cheap methods for car servicing and repair will be needed.

SUMMARY OF THE INVENTION

According to one aspect of the invention, there is provided apparatus for use in robotic servicing of a vehicle comprising a frame having length, width and height, the frame defining a bay for receiving a laterally positioned vehicle and a hallway longitudinally adjacent the bay, the hallway accommodating a mobile robotic servicing sub-system, the frame having a first deck located above the bay and the hallway for placement of components for use in servicing a vehicle and a first automated sub-system mounted for movement thereof along the frame and having a first transfer mechanism for transferring a component held thereby between a position on the first deck and a service-ready position in the hallway. Preferably the apparatus further comprises a wheeled chassis underlying, and supporting the frame. A top of the chassis can provide a floor of the bay and the hallway.

The first transfer mechanism can comprise an articulated arm and a component holder mounted to the articulated arm. The component holder can comprise a plurality of claws mounted on a frame and drivable relative to each other to adjust a separation distance between the claws at spaced edge portions of the component whereby to grip and release a component. The first transfer mechanism can alternatively comprise a first cage configured to hold a component therein. The alternative transfer mechanism can further comprise an elevator mechanism for moving the first cage between a position adjacent the first deck and said service-ready position. Preferably, the first cage is mounted relative to the frame to permit angular rotation of the first cage between a cage vertical position and a cage horizontal position. The apparatus can further comprise a conveyer sub-system for conveying a component from the first deck into the first cage when the cage is in the cage horizontal position. The conveyor sub-system can further include conveying rollers for moving components along the frame, the conveying rollers grouped into multi-roller cells, the cells operable independently of one another.

The apparatus can further comprise a second cage located in the hallway and configured to hold a component therein following transfer from the first cage or other sources. Preferably, the apparatus further comprises a rotary drive mechanism for angularly rotating the second cage about a vertical axis whereby to reverse relative positions of an outer face and an inner face of the second cage and any component contained therein.

According to another aspect of the invention, there is provided apparatus for use in robotic servicing of a vehicle comprising a frame having length, width and height, the frame defining a bay for receiving a laterally positioned vehicle and a hallway longitudinally adjacent the bay, and a mobile robot in the hallway having a component picker to pick a component from a first position, to move with the picked component, and to release the component at a second position, one of the positions being a service-ready location and the other position being a servicing position at a vehicle to be serviced.

According to another aspect of the invention, there is provided apparatus for use in robotic servicing of a vehicle comprising a frame having length, width and height, the frame defining a bay for receiving a laterally positioned vehicle and a hallway longitudinally adjacent the bay, the hallway accommodating a mobile robotic servicing sub-system, and a wheeled chassis underlying, and supporting the frame. Preferably, the apparatus further comprises a ramp mounted at a first chassis hinge at one side of the chassis, the ramp moveable between a servicing position in which the ramp bridges a top of the chassis and the ground at said one side of the chassis and a transportation position in which the ramp is in a generally vertical orientation. Preferably, the ramp comprises a bridge part and a flat part, the bridge part joined to the flat part at a join, the bridge part having an end remote from the join for ground contacting in the servicing position, and the flat part having an end remote from the join connected at the first chassis hinge, the flat part and the top of the chassis being coplanar in the servicing position. The flat part serves to extend the width of the chassis so that the chassis can support a vehicle to be serviced whose wheelbase is greater than the width of the chassis.

According to a further aspect of the invention, there is provided apparatus for use in robotic servicing of a vehicle comprising a frame having length, width and height, the frame defining a bay for receiving a laterally positioned vehicle and a hallway longitudinally adjacent the bay, the hallway accommodating a mobile robotic servicing sub-system, the frame having a roof, the roof hinged at a back end and moveable between a first, operational position for vehicle servicing where the roof is parallel to a top of the chassis and a second, transportation position in which the roof is hinged downwardly so that a front end thereof is closer to the top of the chassis than the hinged back end of the roof.

According to a further aspect of the invention, there is provided apparatus for use in robotic servicing of a vehicle, comprising a wheeled chassis, a ramp mounted at a first chassis hinge at one side of the chassis, and the ramp movable by a powered drive between a servicing position in which the ramp bridges a top of the chassis and the ground at said one side of the chassis and a transportation position in which the ramp is in a generally vertical orientation. The ramp can comprise a bridge part and a flat part, the bridge part joined to the flat part at a join, the bridge part having an end remote from the join for ground contacting in the servicing position, and the flat part having an end remote from the join connected at the first chassis hinge, the flat part and the top of the chassis being coplanar in the servicing position. The join can be provided by a ramp hinge, the apparatus further comprising a member fixed to one of the bridge part and the flat part, the bar having a free end located in a cavity under the other of the bridge part and the flat part to permit movement of the free end about the ramp hinge axis, the movement having a vertical component.

According to a further aspect of the invention, there is provided apparatus for use in robotic servicing of a vehicle comprising a frame having length, width and height, the frame having a first deck for placement of wheels to be used in servicing a vehicle, a vehicle deck below the first deck having a bay extending from one side of the frame laterally to an opposite side thereof for receiving a vehicle for servicing thereof, and a hallway adjacent to and extending parallel to the bay, and a first automated sub-system mounted for movement along the frame and having a first transfer mechanism for transferring a wheel held thereby between a position on the first deck and a servicing position in the hallway.

Preferably, the first transfer mechanism comprises an articulated arm and a wheel holder mounted to the articulated arm. The wheel holder can comprise a gripper having a plurality of claws mounted on a frame, the claws automatically drivable relative to each other to alter their spacing from each other whereby to grip and release a wheel or other servicing component.

The transfer mechanism can alternatively comprise a primary cage configured to hold a wheel therein. The apparatus can further comprise an elevator mechanism for automatically moving the primary cage between a position adjacent the first deck and a position in the hallway. Preferably the apparatus further includes a drive to the primary cage for angularly rotating the primary cage to change its vertical footprint. The apparatus can further comprise a conveyer sub-system for conveying a wheel from the first deck into the primary cage. The apparatus can further comprise a mobile robot in the hallway, the mobile robot having a wheel picker to pick a wheel from a first location, to move, and to release the wheel at a second location.

The apparatus can further comprise a secondary cage located in the hallway and dimensioned to hold a wheel therein, the secondary cage providing at different times said first and said second location, wherein the other of said locations is a wheel bearing of a vehicle being serviced. The apparatus can further comprise an elevator drive to move the second cage vertically in the hallway. The secondary cage provides a 'parking' location for a wheel brought into the hallway with the secondary cage movable vertically to release room for the mobile robot to operate According to another aspect of the invention, there is provided an automatic vehicle servicing station providing an integrated environment and conditions for automatically servicing vehicles and to methods of servicing vehicles. Such methods include but are not limited to taking away wheels previously detached from a vehicle being serviced, and transferring new wheels from storage or readiness positions into desired positions in preparation for attachment to a vehicle being serviced. Such methods further include, for wheel transposing and following detachment of a wheel from a vehicle first bearing, moving the detached wheel to a position in the hallway or in another such hallway at the opposite side of the vehicle, prior to attachment of the wheel to the same vehicle at a different wheel bearing. Other than for maintenance and repair of the servicing station itself, the servicing station can operate in an unmanned state in which drives to all servicing equipment and sub-systems are furnished by on-board electromechanical means, including hydraulic and/or pneumatic systems. Control to the drives is provided by an on-board electrical control system using hardware and software. The on-board control system can alternatively be supplemented or substituted by a remote controller.

In this specification any reference to driving, moving, rotating, elevating, conveying, holding, gripping and the like denotes the use of an automatic drive to effect such drive, movement, rotation, elevation, conveying, holding gripping, etc., without the need for manual intervention other than in the design, construction, installation and commissioning of the servicing station and associated servicing equipment. Such reference also denotes the use of sensors, monitors, clocks, feedback, and the like to ensure that any such drive, movement, rotation, etc., is effected at the right time or juncture in a servicing operation sequence and that such drive, movement, rotation, etc., is effected in a controlled manner and with a predetermined effect. A particular servicing operation may involve the use of both components and tools and these may need to be brought into and out of the servicing hallway. In the specification, the use of the term "components" is intended also to embrace "tools".

The servicing station can be equipped with material feeding and pick-up robots, and conveyors, so that:
  parts to be used, such as new wheels, can be transferred to a desired position from stock;
  parts detached from vehicles, such as used or damaged wheels, can be sent out of the servicing station;
  detached wheels can be transferred from one side of a vehicle to another side of said vehicle for wheel rotation/transposition; and
  other objects such as brake rotors, brake pads, etc., can be transfer internally to desired positions.

The servicing station can have a movable chassis to enable towing of the station to a different location. The servicing station can be demountable mounted on the chassis to enable detachment from the chassis and ground deployment of the station. The servicing station can have one or more bays and one or more vehicle access hallways, the bays and hallways extending laterally across the length of the service station.

An important application of the vehicle servicing station is regular wheel servicing. The tire part of a wheel has a lifetime of about 100,000 km under current technologies. Furthermore, vehicle wheels should be transposed (i.e., rotated) every 10,000 km. In the future, a self driving vehicle operated by a car rental company may run almost constantly with very short stops or parking time. Consequently, daily running mileage may easily reach a value of 1500 km or more. With such heavy use, wheels of each of such cars will need to be serviced weekly or thereabouts, regardless whether there is damage. For car rental companies, wheel work will be the most high-volume maintenance work and will demand high speed and near constant maintenance work at low cost.

A vehicle automatic maintenance station according to an aspect of the present invention is equipped with methods and equipment especially for automatic wheel change and transpose work in an automated manner. One example of wheel servicing robot is described in U.S. patent application Ser. No. 16/403,477, and is operable to detach/attach wheels, check wheel conditions such as tread depth and wheel damage, record information including wheel images, and send information to upper-level controlling systems for recording or tracking, checking wheel balancing condition, balancing a wheel and generally ascertaining whether a wheel is qualified or not qualified to work, etc.

Along with the changes of business mode in the automotive industry, the mode of using and maintaining wheels is also expected to change. Wheels are mainly composed of rubber tubes and rims. Rubber tubes are wearing parts, while rims are durable. Government regulations require that each vehicle has exactly the same tire pattern on the same axle, and that the difference between the front and rear axle patterns shall be within a permissible range. Therefore, in the traditional maintenance method, if a rubber tube of a wheel is damaged and must be replaced, the rubber tube on the other side of the same axle must be replaced at the same time, which causes much waste. In the expected business mode, a rental company will own a large number of vehicles which means they will use a large quantity of wheels. Because wheels need to changed in and out with high frequency, the quantity of wheels handled will consequently be very large. Servicing work to be undertaken directly on tires and rims, such as combining and separating tubes and rims, wheel balancing, tire and rim repair, etc., can all be sent to separate wheel work stations or factories equipped with automated equipment to handle each of these servicing activities at low cost and with high efficiency. In such a scenario, the servicing station of the present invention is used just for wheel works such as detaching old wheels, checking/balancing old wheels as needed, rotating wheels mounting position, etc. In other implementations, some level of that direct servicing is performed at the servicing station.

In another aspect of the invention, electronic tag technology, such as RFID tags, are attached to tires and rims so as to assign each tire and rim its own electronic tag and identification code. Computer databases and programs link the ID of each tire and rim with characterizing record information such as brand, size, tread pattern type, tread condition, production date, mileage, wear, damage, accompanying vehicle, servicing history and other usage history, so that all information and history of a tire and rim are tracked by computer. This facilitates the task of finding and matching tires and rims. If a car wheel is known to be damaged, or found to be damaged after being checked by a servicing robot, the control system can check the database to look for another matching unpaired wheel in the stock of the local servicing station to immediately replace the damaged wheel. If there is no matching unpaired wheel in local stock, another paired and qualified wheels from local stock is obtained to replace the whole axle wheels immediately. Each of these servicing steps are implemented in order to have the vehicle return to work immediately with minimal waiting time.

In the 'lateral' axle situation, if, in the case of a good wheel and a damaged wheel, a matching wheel cannot be directly obtained from local stock, the control system either stocks the left qualified wheel of said axle in the servicing station as unpaired wheel to await a future lateral match, or returns it to the factory. At the same time, tire/rim databases are searched to seek a wheel match. When found, any one of there matching wheels is sent to the location of the other good wheel to form a regulatory acceptable wheel pair. In this way, single unpaired wheels can be reused quickly, and such wheel pair is put into operation with minimal delay.

In the case of a damaged wheel, it is normally sent out of the servicing station to a repair factory. There, it is either repaired or the rim and tire are taken apart and the undamaged one of the tire and rim is matched and joined with a good rim or tire to form another complete 'new' wheel. Then the control system can assign an ID to said 'new' wheel and save its ID and related information into the database. The database can then use the information below the ID of these newly formed good single wheels in turn to find a matching 'lateral' wheel, Since there is a large pool of single tires and rims with easily tracked IDs, if there is a match in the database, then the matching wheel can be located for picking up relatively easily. if there is a match, then it is identified relatively easily. Tires and rims that are completely broken and have no reuse or repair possibility are scrapped.

In the above-described mode of effecting wheel servicing work, operations are speeded up to the extent possible to reduce non-service time of a vehicle to be serviced. A dispatch center connects to and exchanges data with the servicing station and with wheel factories to form a network. The dispatch center uses dispatch programs, computer systems and networks to manage all vehicle servicing work. The servicing station is used to detach/attach a wheel from/to a hub of a vehicle and, check it and upload the information, as 'front end work'. All the work related to combine or separate tire and rim, or repair them, or pair a wheel with another wheel, is done in wheel work factories, as "back end work'. Under this operating mode, when it is planned to change wheels of a vehicle, the dispatch center determines the time and location of service, then selects 1, 2 or more pairs of mated wheels needed by the target vehicle from the database, and sends them to a target servicing station in preparation for wheel exchange. Once the target vehicle arrives at the target servicing station, all the old wheels are detached, wheels planned to be reused by the same vehicle are checked by WSR, then qualified reusable wheels and new wheels are attached to the vehicle, and detached unusable old wheels are sent out directly to a wheel factory for repair or reuse. In this way. the vehicle is restored to its working condition in a very short time. However, wheels of certain common sizes frequently used by many vehicles are regularly refilled to maintain the servicing station stock as spares.

In the case of wheels that need to be transposed/rotated, the target vehicle arrives at a target servicing station at predetermined time according to an order from the dispatch center. Then in a rapid operation all wheels are detached, checked and balanced by the servicing station on-site service robot. If all wheels are in qualified working condition, wheels transposition is effected by the servicing station. If in the process of wheel transposing, any wheel is found not to be in working condition, such as worn out, damaged, unable to be balanced, it is dismissed from further used on the target vehicle, and an on-site controlling program at the servicing station finds a matching wheel or wheel pair stored in its stock, picks it up and transfer it to the target vehicle and attach it to the vehicle. If there is no matching wheel or wheel pair in stock, the vehicle is held at the station and the dispatch center immediately looks for a matching wheel or wheel pair in a wheel factory or other vehicle service stations and sends it to target servicing station, which then attaches this new wheel or wheel pair to the target vehicle.

According to another aspect of the invention, there is provided a method of robotic servicing a vehicle comprising driving a vehicle to be serviced laterally into a servicing station having a bay defined by a part of a frame, the frame having length, width and height, the bay having an immediately adjacent servicing hallway defined by another part of the frame and extending laterally of the frame, moving a first automated sub-system along a deck mounted on the frame to a first position above the hallway, operating a first transfer mechanism forming part of the first automated sub-system to pick a component from the first position and transfer the component to a second position in the hallway, and operating a mobile robotic servicing sub-system accommodated in the hallway to pick the component from the second position, transfer the component to the vehicle, establish servicing engagement between the component and the vehicle, and perform a servicing action on the vehicle using the component.

Preferably, the frame is supported by a wheeled, ground-supported chassis having sides and having a top providing a floor of the servicing station, the method further comprising, prior to driving a vehicle to be serviced laterally into the servicing station, preparing the servicing station by downwardly hinging a ramp at each side of the chassis and adjacent the bay from an upward transportation orientation to a servicing orientation in which an outward end of each ramp bears against the ground on either side of the chassis to permit said driving of the vehicle to be serviced into the bay from one side of the chassis and driving of the vehicle out of the bay at the other side of the chassis.

The transfer mechanism can comprise a holder mounted on an articulated arm, the holder having a plurality of claws mounted on a supporting frame, the method further comprising driving the claws relative to each other to adjust a separation distance between the claws at edge portions of the component.

The articulated arm can be mounted to a base member of the first automated sub-system, the method further comprising articulating the arm relative to the base member to produce angular rotation of the holder about three mutually orthogonal axes.

BRIEF DESCRIPTION OF THE DRAWINGS

FIG. 6 is a front view of the servicing station of FIG. 2.

FIG. 7 is a perspective view from above and one side showing a wheel transport equipment according to an embodiment of the invention.

FIG. 8 is a front view of the wheel transport equipment of FIG. 7.

FIG. 9 is a perspective view from above and one side of a chassis of the servicing station shown in FIG. 1 according to an embodiment of the invention.

FIG. 10 is a perspective view from below and said one side of the chassis of FIG. 9.

FIG. 13 is an upper perspective view of a powered vertically adjustable foot assembly according to an embodiment of the invention, the foot assembly shown retracted.

FIG. 14 shows the vertical powered foot assembly of FIG. 13 when extended.

FIG. 150 is a front perspective view of the main frame of the servicing station of FIG. 1.

FIG. 15 is a front perspective view of the main frame of the servicing station of FIG. 1, the main frame fixed to an underlying chassis.

FIG. 31 shows a further step in the procedure of FIG. 31 in which a wheel arrives at an upper position above a turning conveyor.

FIG. 32 shows a further step in the procedure of FIG. 31 in which the wheel is moved from the turning conveyor onto a swing conveyor and within a basket.

FIG. 33 shows a further step in the procedure of FIG. 31 in which the wheel is locked by the basket, and the swing conveyor moves out of a path of the wheel elevator.

FIG. 34 shows a further step in the procedure of FIG. 31 in which the basket and contained wheel are rotated to a vertical position.

FIG. 35 shows a further step in the procedure of FIG. 31 in which the basket and contained wheel are moved to a lower position.

DETAILED DESCRIPTION OF THE INVENTION INCLUDING THE PRESENTLY PREFERRED EMBODIMENTS AND METHODS

Figure 1:
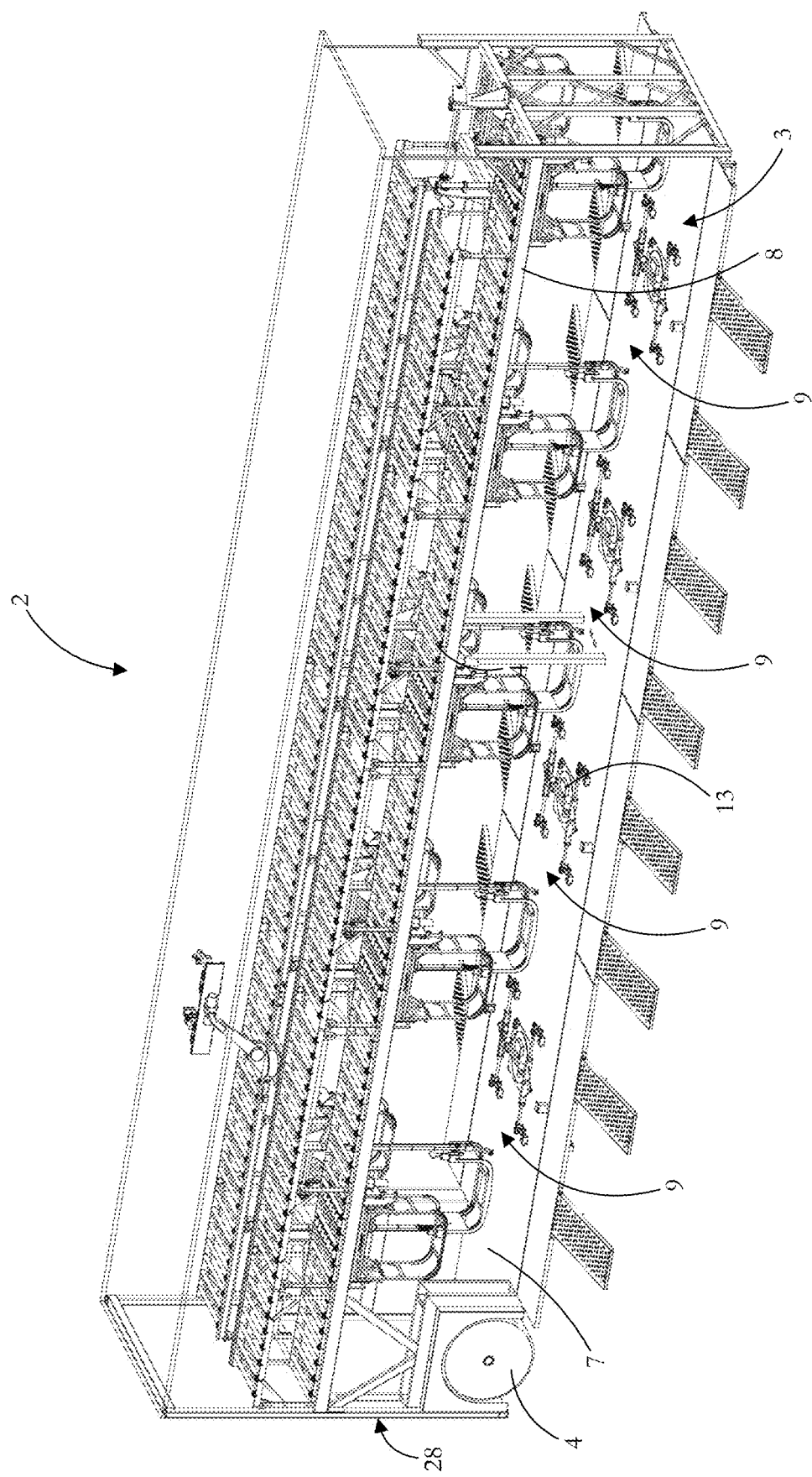
FIG. 1 is a perspective view from the front and one side of a servicing station according to an embodiment of the invention.
Figure 2:
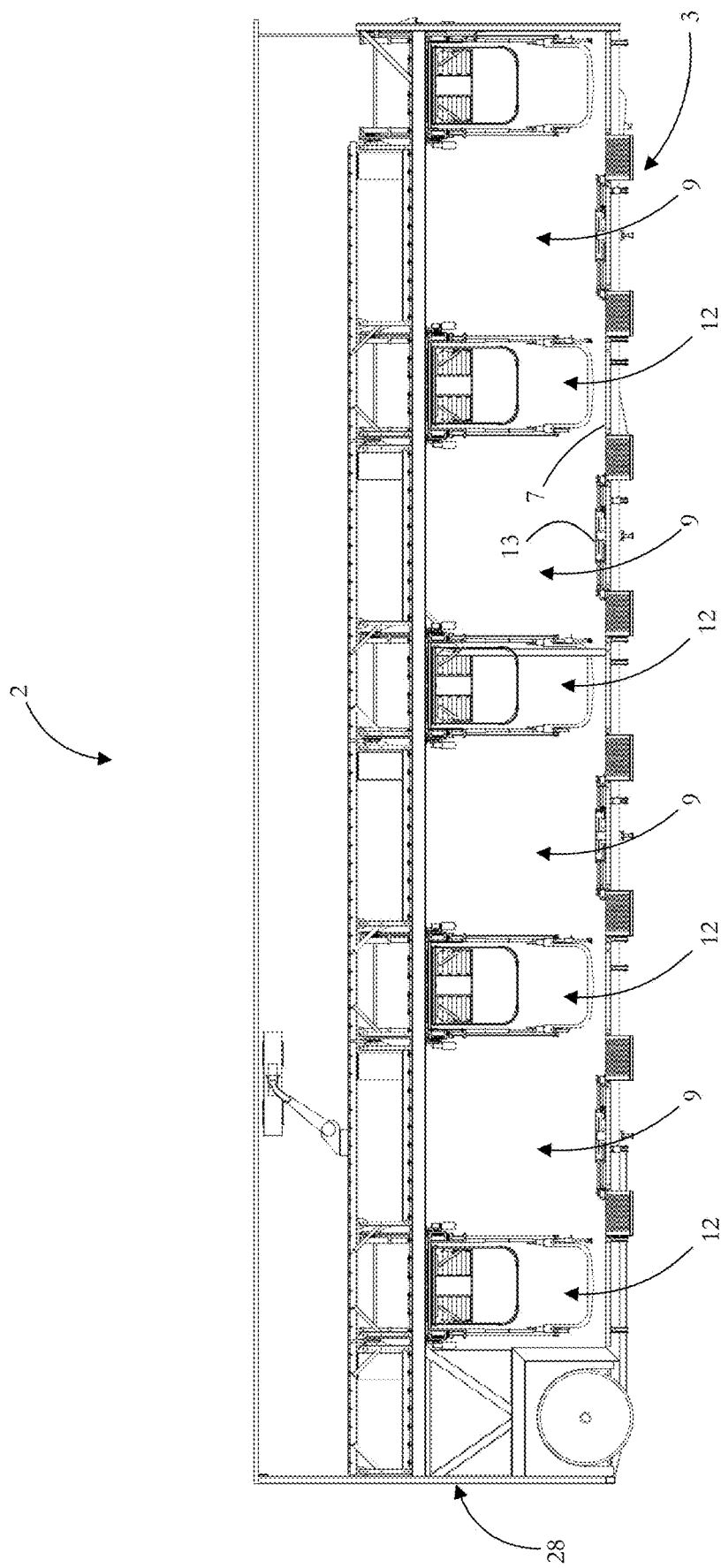
FIG. 2 is a side view of the servicing station of FIG. 1.
Figure 40:
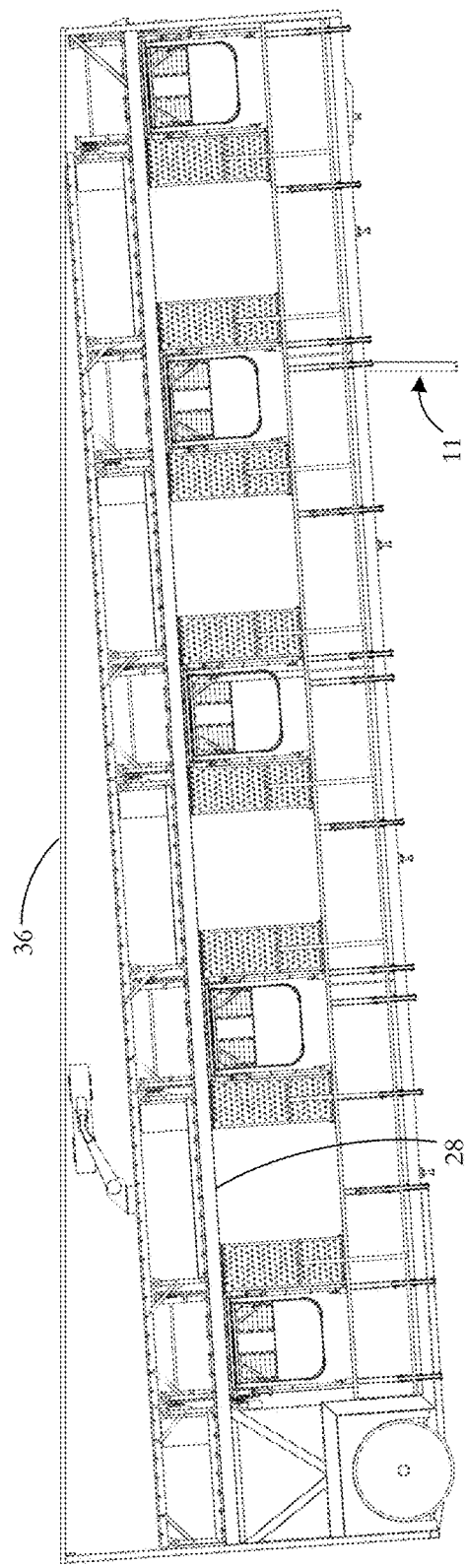
FIG. 40 is a side view of the service station with its front end lifted up by the landing gear, for preparation of transporting a combination of the chassis, frames and ramps according to an embodiment of the invention, the combination for the servicing station of FIG. 1.

Referring to FIG. 1, there is shown a vehicle servicing apparatus or station 2 comprising a chassis 3 having wheels 4 mounted near the chassis back end and a downwardly projecting king pin 5 (FIG. 4) near the chassis front end for connection to a tractor unit (not shown). The chassis 3 supports units, structures and components used for vehicle servicing operations. It has a floor 7 supporting a main frame 28 having length, width and height. The elements of the frame 8 define four bays 9, each dimensioned to accommodate a vehicle 10 (FIGS. 2, 3) to be serviced, the vehicle positioned laterally on the frame 28. The invention contemplates a single bay as well as any other plurality of bays subject to some limitation on chassis length as determined by the convenience of moving and operating the vehicle servicing apparatus, and government regulations. Whereas the bays 9 in the illustrated embodiment are equal in width, the invention contemplates bays of different width; for example, a bay width tailored to accommodate a large vehicle, such as a dual rear wheel pick-up truck, or a small vehicle such as a motor bike. The chassis has powered landing stands 11 (FIG. 40) located near its front end which are automatically deployed when needed to support the chassis front end directly on the ground. The landing stands 11 are stored away on the chassis when ground support is not needed; for example, when the chassis is fitted to a tractor unit prior to the servicing apparatus being moved. The chassis has other equipment and components such as brakes, signals, etc., necessary for enabling the vehicle servicing apparatus to be towed b the tractor unit.

Extending parallel to each bay is an operations hallway 12. The hallway 12 accommodates robotic servicing equipment which is automatically moved in the hallway 12 under computer control. As will be described presently, depending on the function or functions of the particular robotic servicing equipment, it may be moved vertically, lengthwise or laterally in the hallway 12. In the case of a multi-bay embodiment, certain equipment in a hallway 12 located between two adjacent bays may be used to service a vehicle 10 in one of the bays 9 and later turned to service a vehicle 10 in the adjacent bay. If there is more than one bay, the layout allows independent servicing and repair at respective bays 9 without a vehicle 10 in one bay 9 blocking the entrance or exit of a vehicle 10 into or out of any other bay 9. If faster servicing operations are needed, then more than one unit of a particular piece of robotic servicing equipment are accommodated in a hallway.

Within each bay 9 and mounted generally centrally on the bay floor is a hoist 13 (FIGS. 1, 9) which is used to lift a vehicle 10 in the respective bay 9 so that the vehicle wheels clear the floor to permit servicing. The exemplary hoist 13 illustrated in FIG. 9, has arms having respective lift pads near their outer extremities. The arms are adjusted to bring the pads to positions under corresponding lift points formed at strengthened support elements of the chassis or body of a vehicle being serviced. The hoists are powered by a hydraulic, pneumatic or electrical drive and, like other station sub-systems used in vehicle servicing, are under automatic control. As one option, the hoist 41 can be as described in U.S. Patent Application 62/824,308 which is hereby incorporated by reference in its entirety for all purposes.

Figure 3:
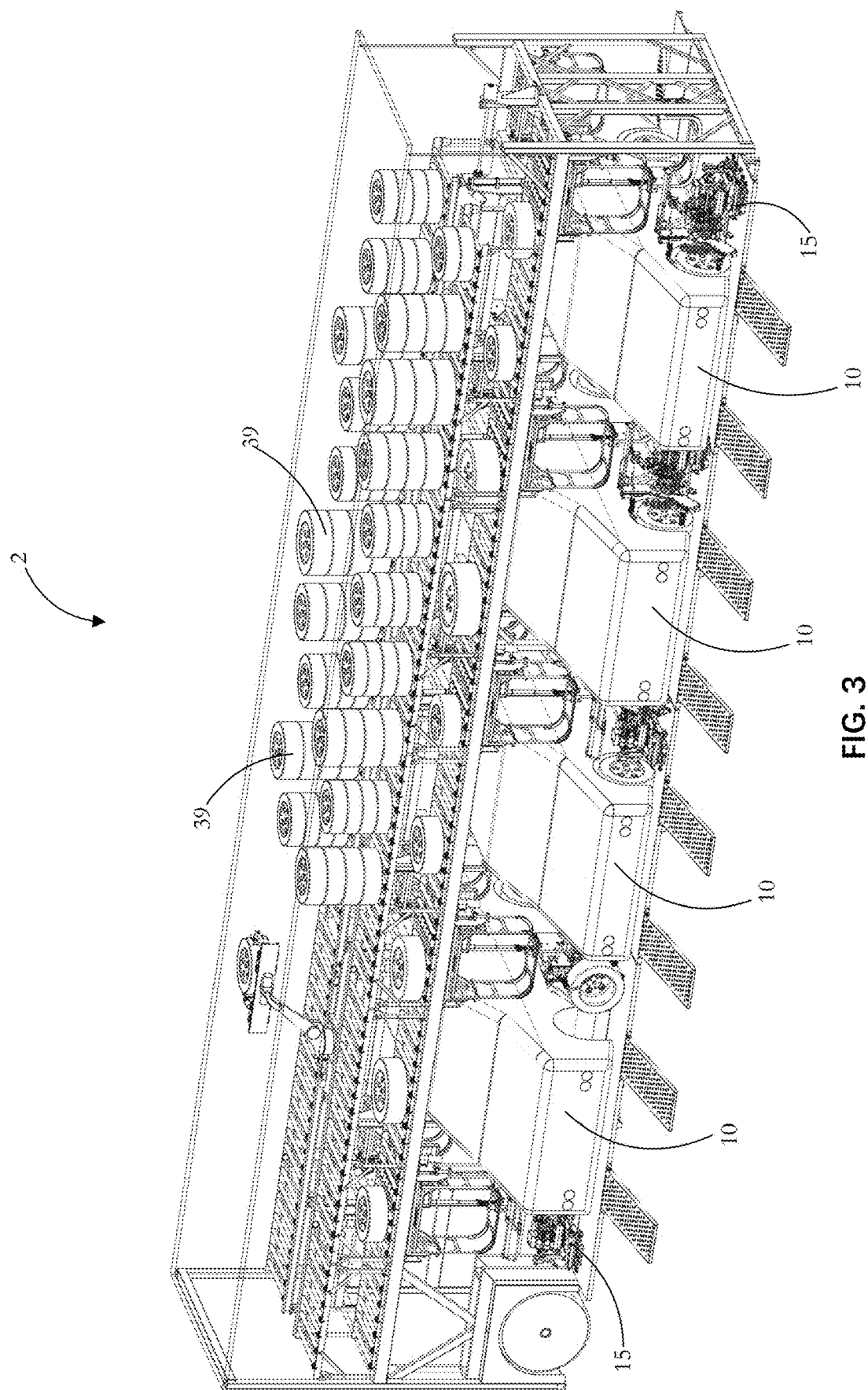
FIG. 3 is a perspective view corresponding to FIG. 1, but showing the station loaded with vehicles to be serviced.
Figure 4:
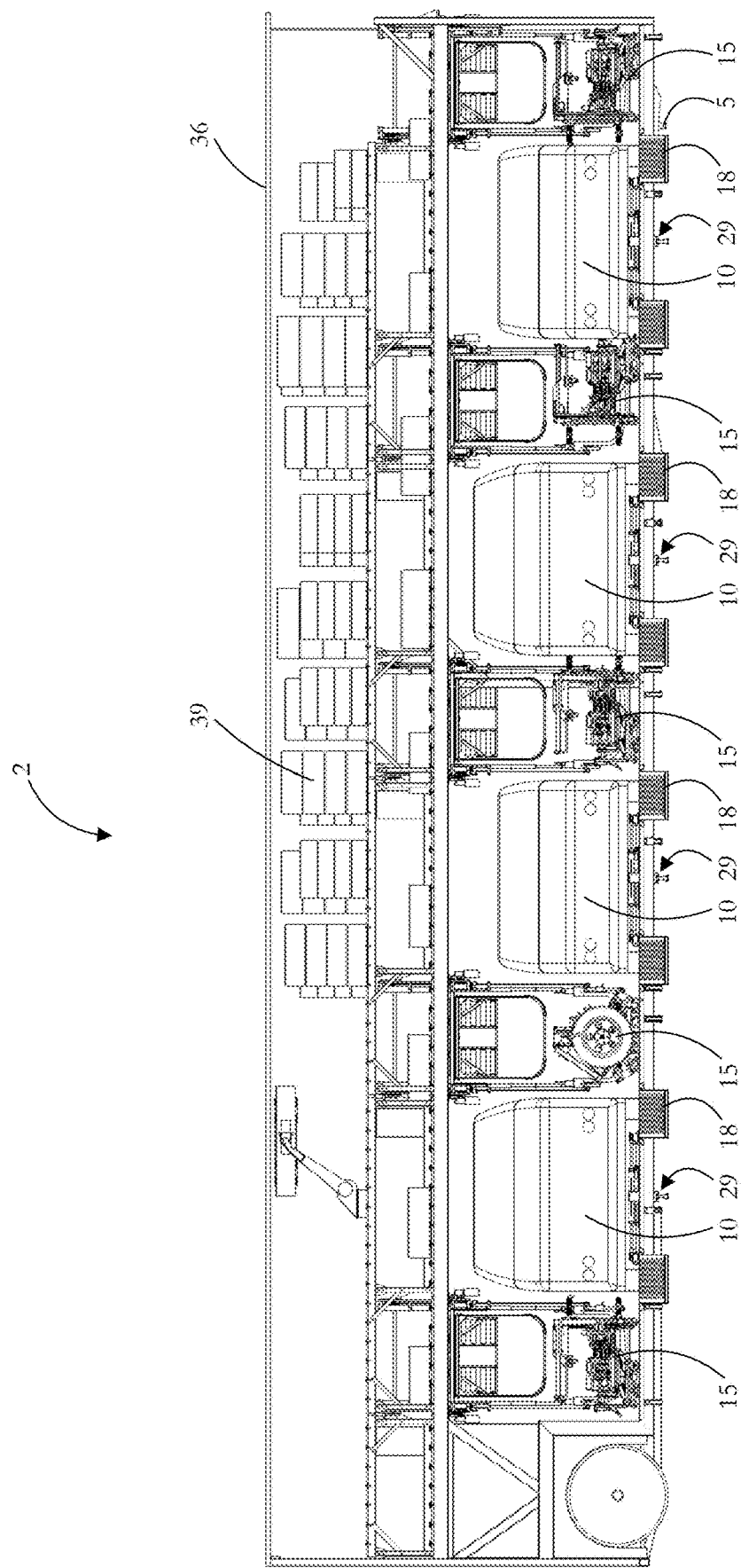
FIG. 4 is a side view of the servicing station shown in FIG. 3.
Figure 5:
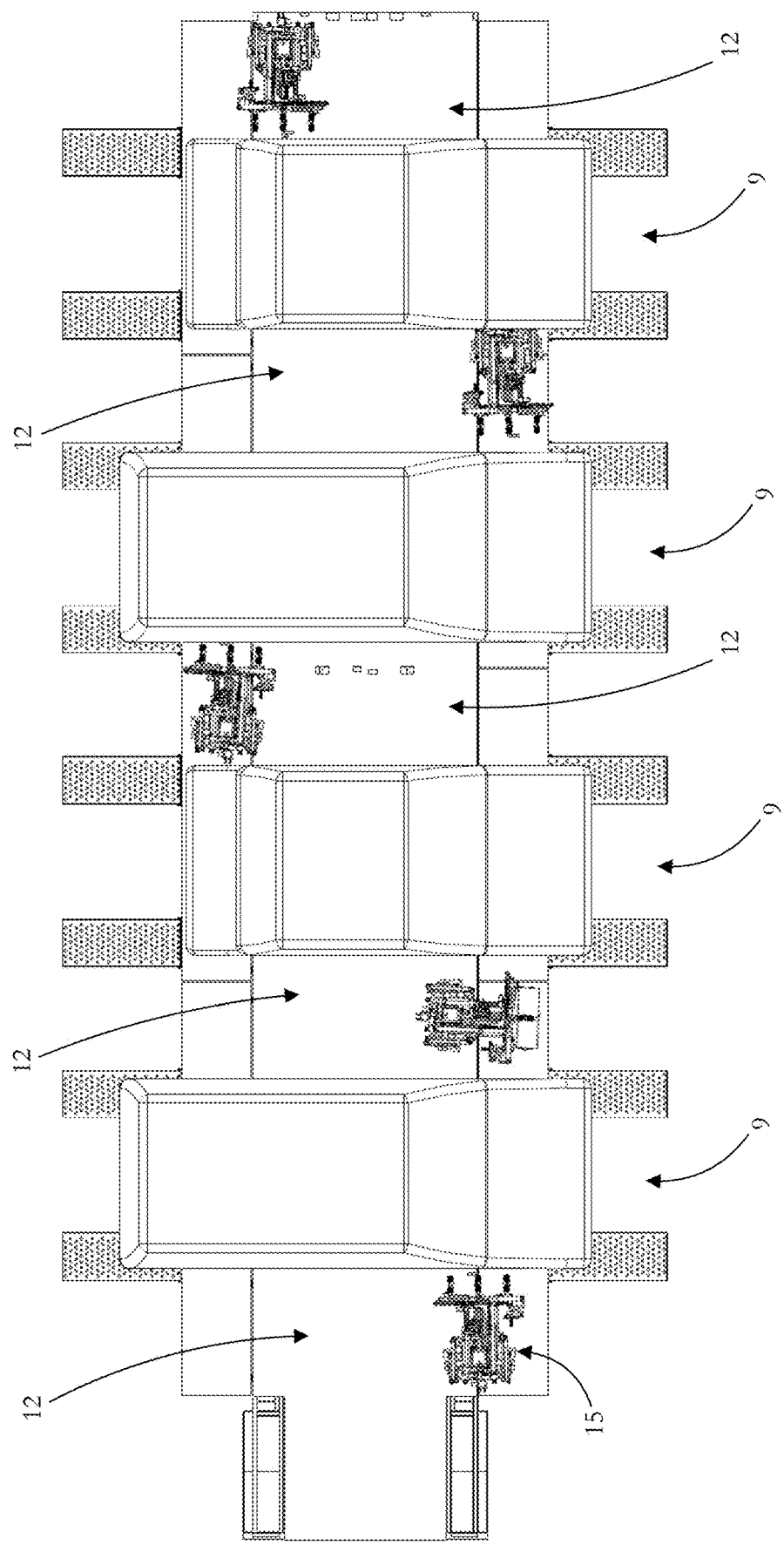
FIG. 5 is a top view of the servicing station of FIG. 2 showing an exemplary disposition of service robots in hallways and vehicles in bays.
Figure 11:
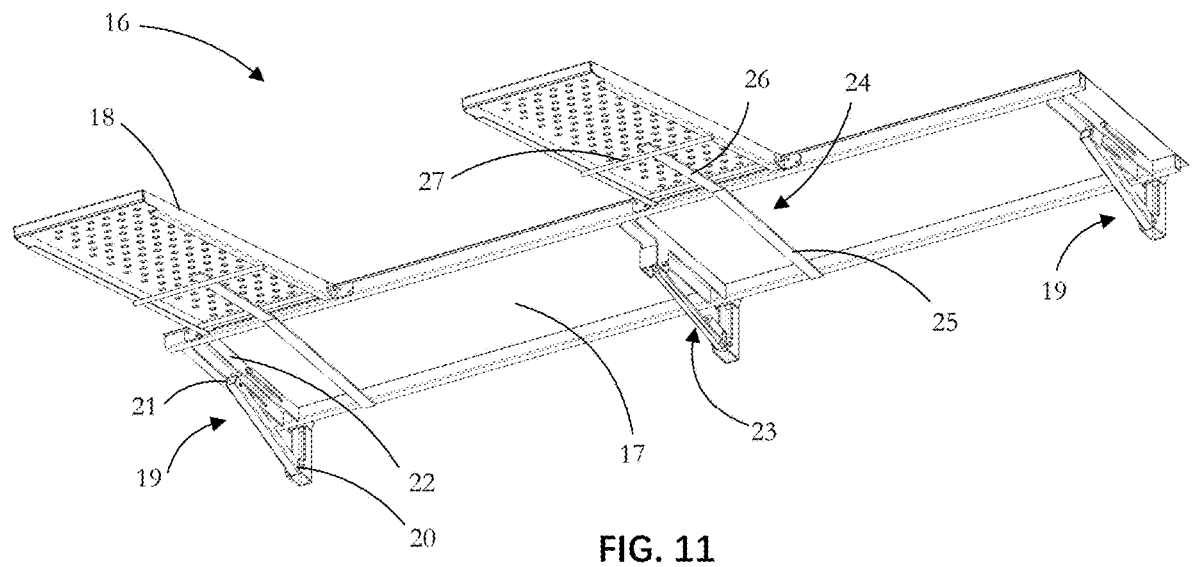
FIG. 11 is a scrap view showing the ramp of the chassis of FIG. 10 in greater detail.

As shown in FIGS. 3, 4 and 5, a wheel servicing robot (WSR) 15 is present in each hallway 12. The WSR 15 can be of any suitable form including that described in co-pending U.S. patent application Ser. No. 16/403,477, the disclosures of which is hereby incorporated herein by reference in its entirety and made part of the present application for all purposes. In one exemplary form, the WSR has several wheel servicing sub-systems (WSS) supported on a chassis, the WSS having interface parts engageable with wheel interface parts to permit WSS operation to service a wheel. A control unit on the WSR provides automated control of the WSR operation in relation to (a) the position and features of a vehicle being serviced, (b) features defining the hallway 12, and (c) other robotic equipment sharing the hallway. The sub-systems of WSR provide at least one or more of: supporting and manipulating a servicing tool position; detaching and attaching wheel fasteners; storing and retrieving fasteners; local jacking; wheel gripping and moving; tire inspecting; tire pressure regulating; and wheel balancing. In this specification, the term "wheel" connotes a wheel that has a rubber tire. In another embodiment (not shown), the servicing robot is used for servicing elements of a vehicle other than wheels.

Figure 12:
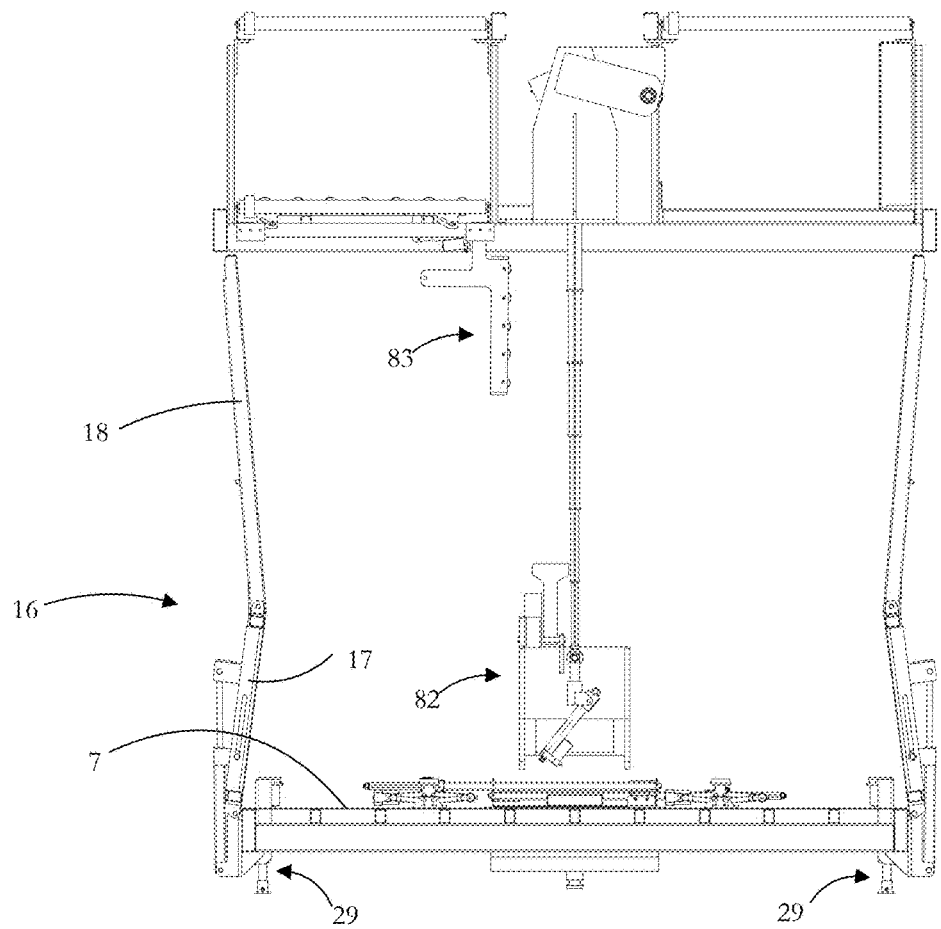
FIG. 12 is a front view of the servicing station shown in FIG. 3, showing ramps in stored position for transportation.
Figure 16:
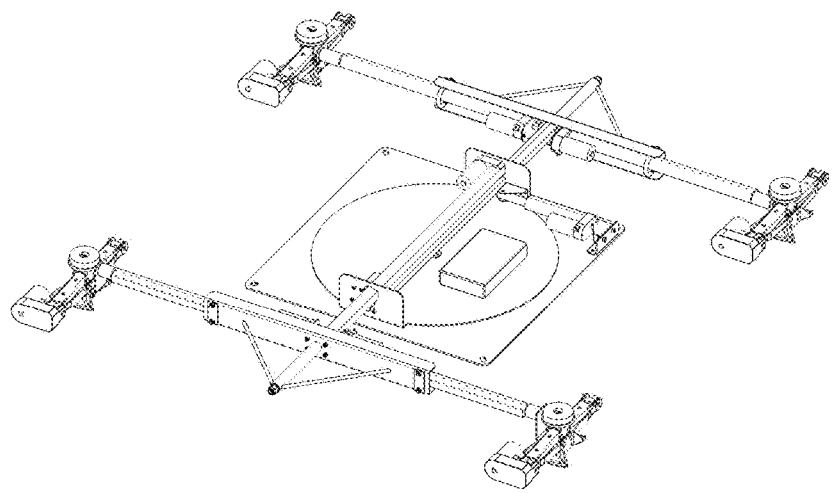
FIG. 16 shows an automatic hoist for the servicing station of FIG. 1.

Mounted to the chassis sides are ramps 16 (FIG. 6). When in a servicing position as shown in (FIGS. 1-6), a pair of the ramps at each side of the station enable a vehicle to drive up from adjacent ground into one end of a bay 9 in preparation for servicing, and to be driven out of the other end of the bay 9 and down onto adjacent ground after servicing is complete. The two ramps may be replaced by a single wide ramp but a double tracked ramp, being lighter, is preferred. The ramps 16 are maintained in a servicing position for as long as the servicing station 2 is to operate at a particular location and are folded away and nested into a side of the servicing station (FIGS. 12, 40) when the station is to be transported to another location. The ramps 16 are powered by a hydraulic, pneumatic or electrical drive and, like all other station sub-systems used in vehicle servicing, are under automated control.

As shown in FIG. 9 to FIG. 12, the ramps 16 have rectangular flat sections 17 hingedly mounted to each side of the chassis floor 7 along one long edge, the sections 17 serving to extend the usable length of a bay 9 beyond the width of the floor 7. Hingedly mounted to opposed long edges of the flat sections 17 are pairs of bridge sections 18 which bear against the ground at their outer ends to provide mounting slopes when the ramps 16 are deployed for vehicle servicing. Under and near each end of the flat sections 17 are support linkages 19. One end 20 of each support linkage 19 is hinged relative to the chassis and its other end 21 is slidable in a guide 22 relative to the ramp flat section 17. Between the support linkages 19, a piston and cylinder actuator 23 has one end hingedly mounted to the chassis and its other end hingedly mounted to a flat section 17. The actuators 23 retract to move the ramps 16 to operating positions for vehicle servicing. They deploy to move the ramps 16 through 90 degrees to nesting positions suitable for transporting the servicing station.

Assisting bars 24 bent in the middle and aligned with center lines of respective bridge sections 18 have inner sections 25 fixed to the underside of flat section 17. Each bar outer section 26 extends into a cavity formed between the corresponding bridge section 18 and cross bar 27 that is welded or otherwise fixed to the bottom of bridge section 18. In this way, the bar inner section is fixed and the bar outer section, to some extent is free to move. While the bar outer section 26 underlies part of respective bridge sections 18, it does not take any substantial vehicle load. As a vehicle mounts a ramp 16, its load is applied to the ground through the bridge section outer end and to the chassis through the ramp flat section mounting. In servicing mode, the assisting bar 24 allows some tolerance in the angular aspect that the ramp bridge section 18 can take up relative to the adjacent flat section 17. This tolerance accommodates minor variation from horizontality of the ground supporting the ramp outer end. In transportation mode, when the flat sections 17 are hinged upwardly to suitable positions inside a main frame 28 (FIG. 12, 40), the assisting bars 24 ensure that the ramp bridge sections 18 are similarly, interiorly nested. As an alternative, the outer end of the bar is fixed at the bridge section and the inner end has some degree of freedom of movement at a corresponding cavity at the flat section (not shown).

The chassis unit is equipped with multiple powered stands 29 (FIGS. 4, 13, 14) located along both sides of the chassis at the entrance and exit of each bay 9. Each stand 29 has a mounting bracket 30 fixed on the underside of the chassis, a linear actuator 31 having one end 32 fixed to bracket 30 and its other end fixed to ground contacting foot 33. The stands 29 incorporate sensors which determine the compression force between the ground and the respective stand 29. Alternatively, the compression force is measured by monitoring real-time operating parameters of the actuator 31, such as electrical current, air pressure or hydraulic pressure. The stands 29 can have other sensors for determining orientation of the ground immediately under the stand and the direction and extent to which the stand departs from being strictly vertical. The stand 29 can support the chassis on uneven ground, and also provide direct support to each bay. The control system can adjust the stroke of each stand 29 to adapt to the shape of the ground, so that the chassis is uniformly supported, and the level of the chassis floor can also be adjusted to keep horizontal.

The main frame 28 (FIG. 15) is made from metal panels and beams using suitable construction techniques such as welding, screw fixtures, riveting, gluing, etc. The frame 28 has vertical posts 34, and horizontal bars 35. In one implementation, the lower end of frame 28 is joined to floor 7 of the chassis 3 to form the main body of the servicing station 2. The frame 28 is covered by a roof 36 (FIG. 4) and side shield units (not shown) to provide protection against weather elements and to close the servicing station for safety and security reasons. In one implementation (FIG. 40), particularly for use when the servicing station is being transported by road between operating locations, supporting parts of the frame 28 attached to the roof are manipulated to tilt the front of the roof 36 downwardly so that when the servicing station is hitched to a tractor unit, its front end is low enough to meet road transport height regulations and is raised back to full height when the station is deployed for vehicle servicing. The side shield units are configured to maximize coverage and protection and in one form (not shown), it can be in the form of hinged side panels that can be opened and closed similar to an umbrella, the upper edge of each side baffle is hinged to the upper edge of one side of the frame. Lower end of each side panel can be driven to a downward position by an actuator, to cover the service station when needed, or when the service station is open for service, it can be expanded upward to become a sub-roof to shield the rain and snow.

Figure 17:
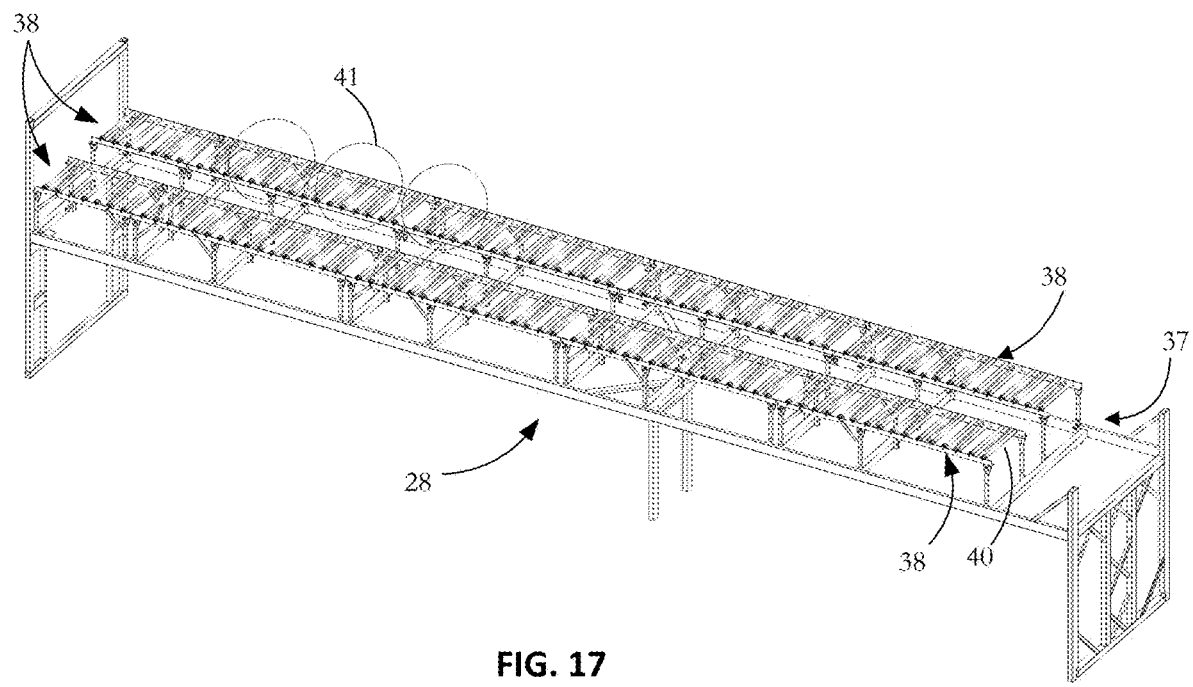
FIG. 17 is a perspective view from above and one side of a combined main frame and upper frame forming part of the servicing station of FIG. 1.

The main frame 28 supports an upper frame 37 having two conveyor lines 38 extending longitudinally, side-by-side and with a space between them (FIG. 17). In operation, new wheels are fed from a stock entrance at the left end of the servicing station, where they are piled together as wheel sets and placed upon the conveyors 38. A set or pile 39 of wheels (FIG. 3) refers to the wheels to be used by one vehicle, typically being one pair of wheels for the vehicle front axle and another pair for the rear. After all new wheel of a wheel set are piled on conveyor lines 38 on the entrance end, the new wheel pile will be moved away along the conveyors at once from the conveyor input ends, which creates space at the input ends for ease and high efficiency wheel stock refilling. In one implementation, each wheel has its own RFID or like identifying label which is read wirelessly or by other means such as sensors mounted around the servicing station. When a wheel set is placed upon a conveyor line 38, conveyor rollers 40 are rotated to move the pile forward, until they close up to an adjacent wheel pile. Each conveyor line 38 has multiple rollers 40 which are automatically operated to move wheels supported by them forwardly or backwardly, or to keep them in place. Several adjacent rollers 40 are driven as a roller cell 41 by a common drive for ease of manipulation of the piles, so rollers of one roller cell can be independently rotated in a direction and at a speed different from other roller cells. Each roller cell 41 is assigned an address code, and control system can control the status of any roller cell according to it's address code or position. With this structure, each pile of wheels can be moved forward, backward or stopped to increase wheel pile storage density on the conveyor lines 38. As wheel piles of a wheel pile are all taken into the service bays 9 from their positions on the conveyors 38, a vacancy is formed on the conveyor line 38, then all wheel piles after said vacancy will move forward to a position beside the nearest wheel pile on the front side, so as to close up spaces between adjacent wheel piles. The position of each wheel or wheel pile on the upper conveyor lines is remembered and/or identified by the station controlling system using sensors and ID from electrical labels on the wheels.

Figure 18:
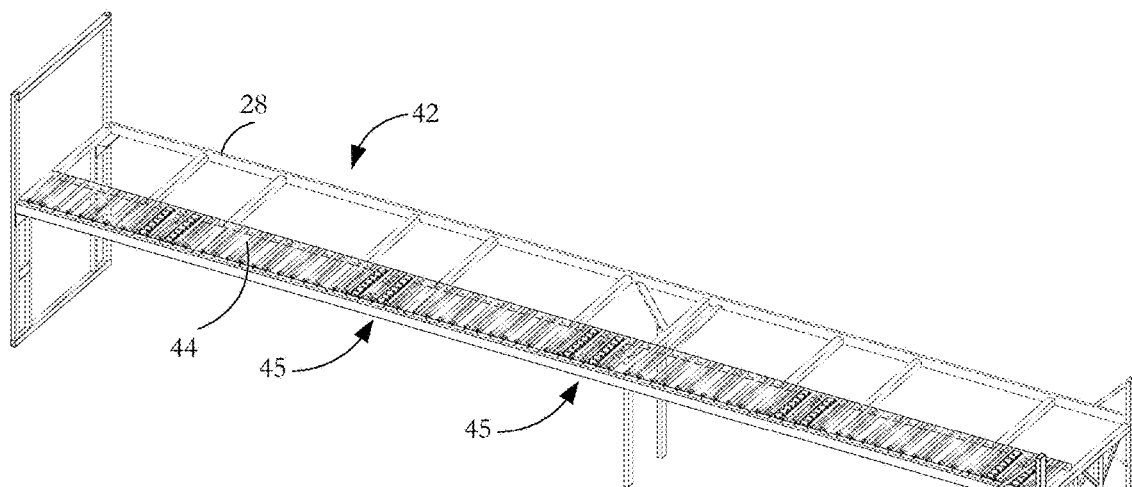
FIG. 18 shows a main frame with lower conveyor and turning conveyors, according to an embodiment of the invention.
Figure 19:
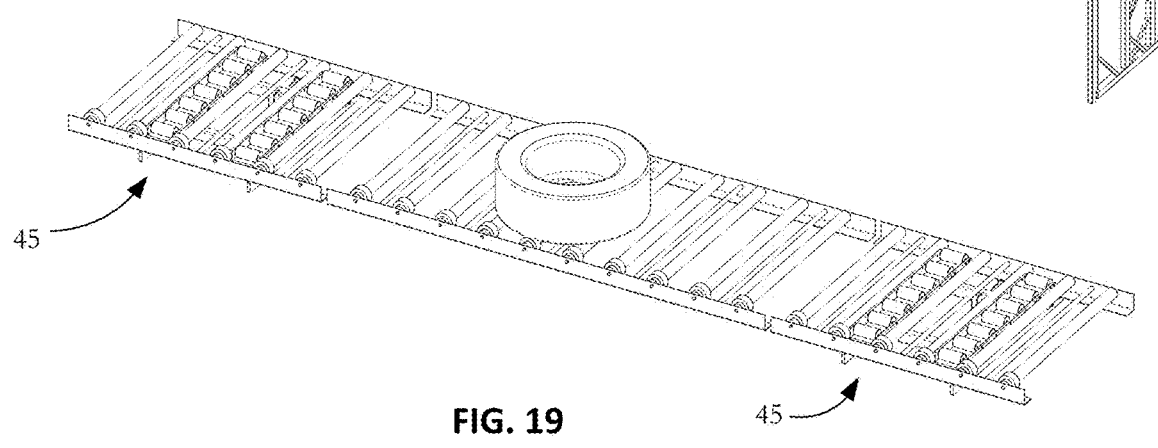
FIG. 19 shows a segment of FIG. 18 showing part of the lower conveyor and a pair of turning conveyors.

As shown in FIG. 18, a lower conveyor unit 42 is used to distribute wheels transferred either from upper conveyor lines 38 or from a wheel elevator 43 (FIG. 28), to a desired position. The lower conveyor unit 42 has a conveyor line 44 which has multiple short and long sections (FIG. 19). The conveyor line 44 extends over half the width of the main frame 28, the other half frame width being used for contain other equipment such as air compressor, generator, electrical control boxes, etc. The line 44 extends the full length of the frame 28 to enable components such as old wheels to be transferred out at the right end. The conveyor unit 42 has a turning conveyor 45 above each hallway 12.

Figure 20:
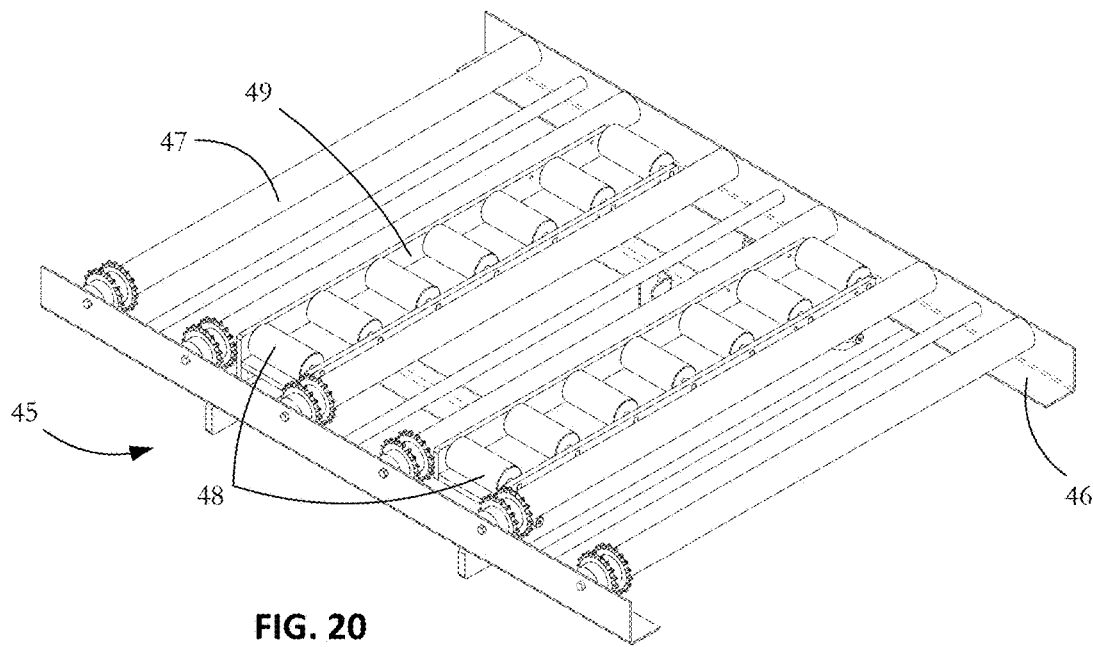
FIG. 20 shows a turning unit combined from one of the turning conveyors and a short length of the lower conveyor.
Figure 21:
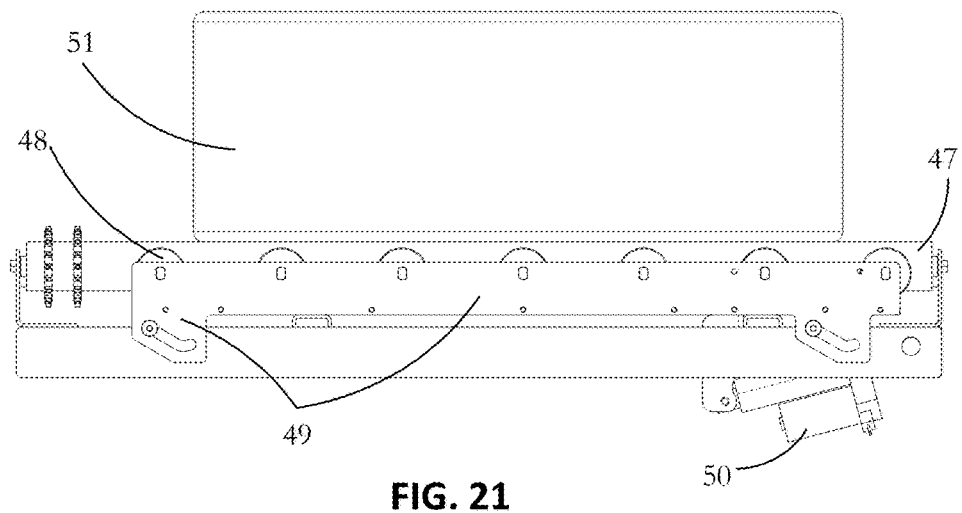
FIG. 21 is a side view of turning unit components shown in FIG. 20 with a wheel supported by the lower conveyor.
Figure 22:
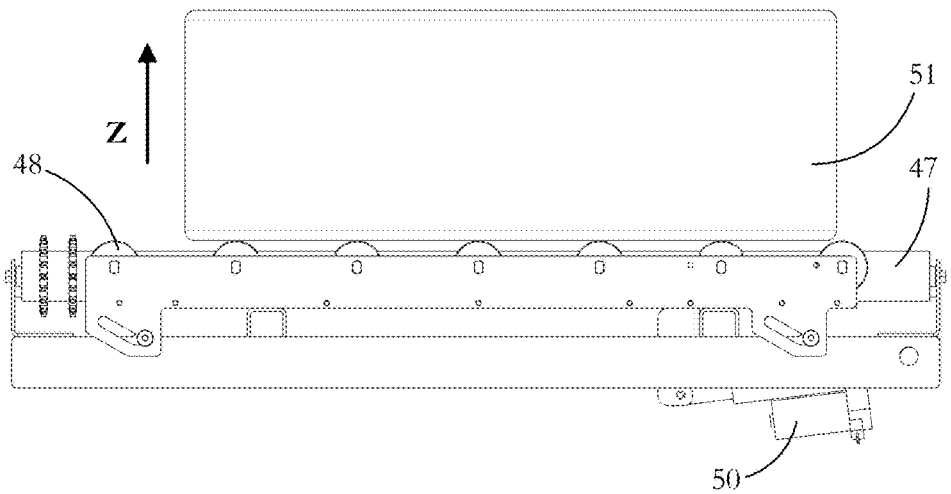
FIG. 22 is a side view corresponding to FIG. 21 but showing turning rollers moved up and supporting the wheel.
Figure 23:
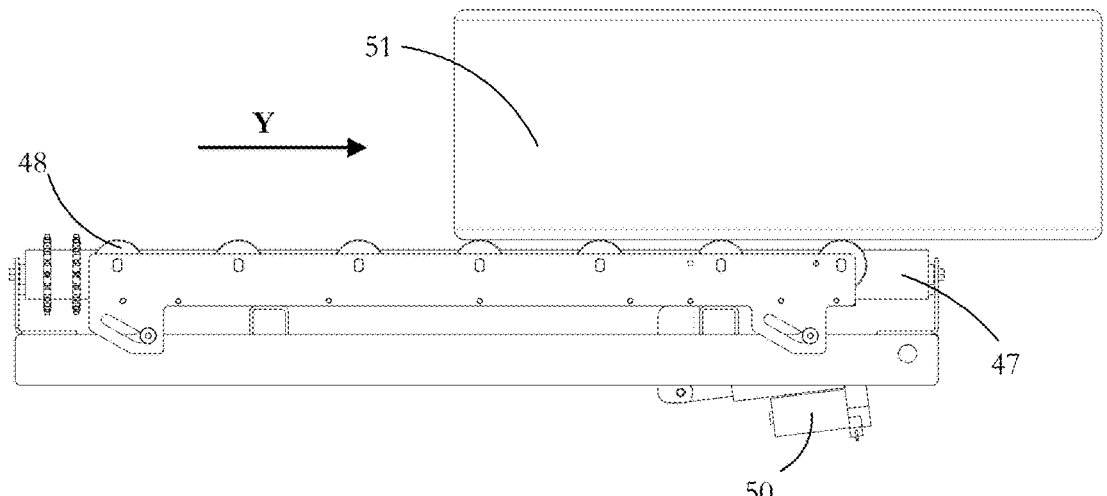
FIG. 23 is a side view corresponding to FIG. 21 but showing the wheel being moved out of the lower conveyor driven by and along the turning conveyor.

Each turning conveyor 45 is attached to a short section of lower conveyor line 44 (FIG. 20). The conveyor section 46 has rollers 47 and is fixed to a part of frame 28. Turning conveyor 45 is mounted on bars 49 fixed to side rails of conveyor section 46. Rollers 48 of turning conveyor 45 are raised by actuator 50 (FIGS. 21-23) when desired to bring their supporting surfaces to a level higher than those of rollers 47. The rollers 48 are then operated to drive the supported wheel in a direction orthogonal to the direction of conveyor line 44. In operation, a wheel is firstly supported by rollers 47, with rollers 48 being lower than rollers 47 (FIG. 21) so that the wheel is free to move along conveyor line 44. Rollers 48 are then moved upwardly in direction Z, to bring rollers 48 higher than rollers 47 (FIG. 22). Rollers 48 are then rotated to drive wheel 51 in direction Y. Other rollers of conveyor line 44 between turning conveyors 45 can be divided into small groups such as roller cells to be run independently. Each roller cell is assigned an address code enabling its rollers to be rotated in a direction and speed different from other roller cells in lower conveyor line 44.

Figure 24:
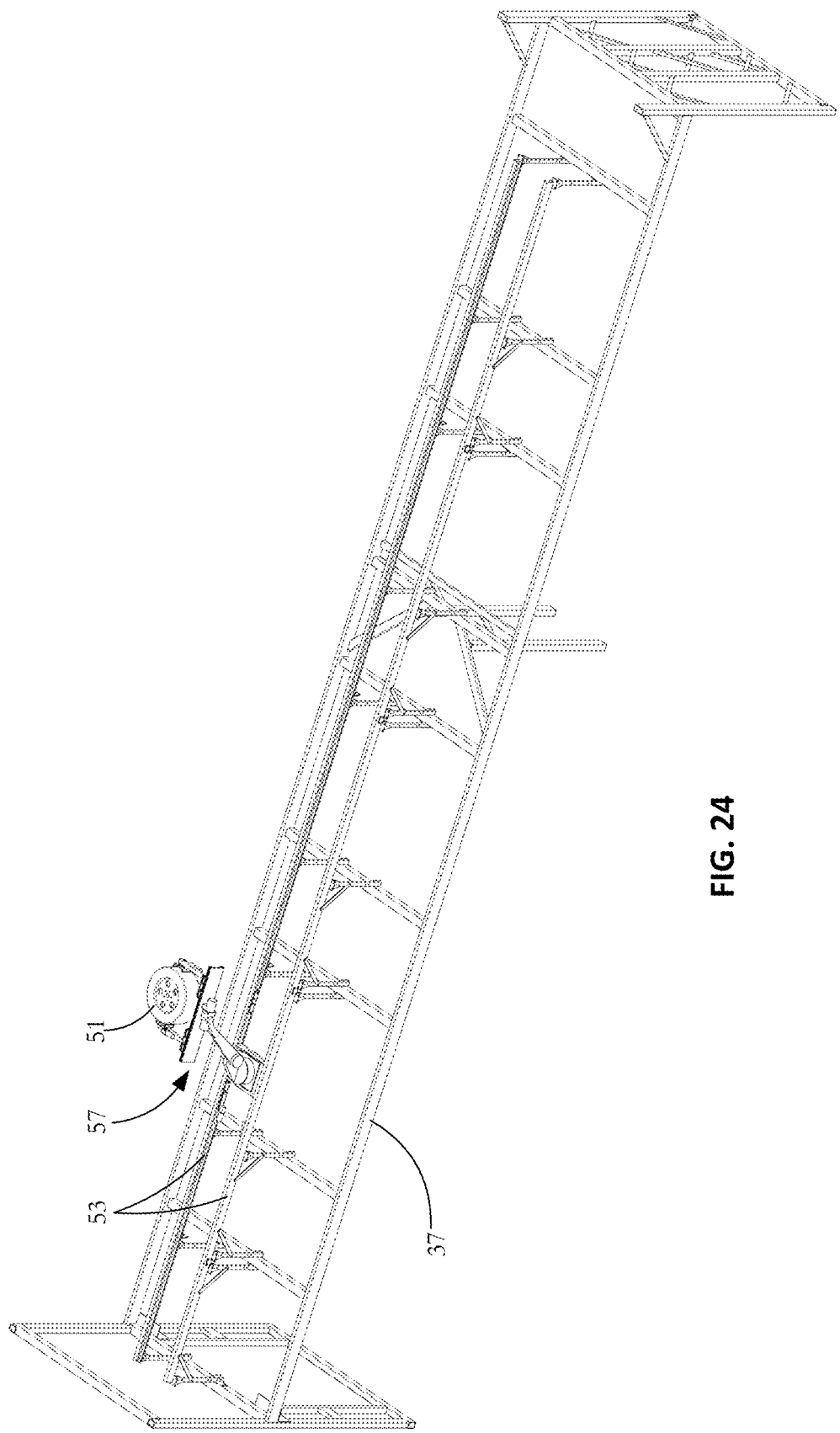
FIG. 24 is a perspective view showing the combination of the frame, a wheel pickup robot and mounting rails therefor.
Figure 25:
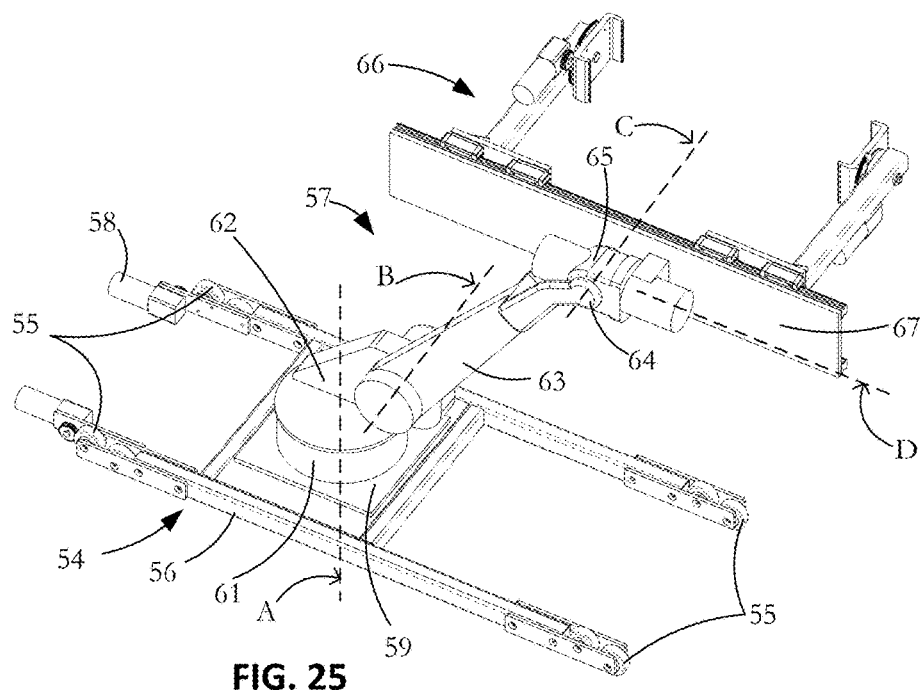
FIG. 25 is a perspective view of a wheel pickup robot according to an embodiment of the invention.

Integral with the upper frame 37 are parallel rails 53 (FIG. 24) on which is mounted an automated sub-system. The sub-system has an H-frame structure 54 (FIG. 25) with wheels 55 mounted on arms 56 and received in the rails 53. A wheel pick-up robot 57 (FIG. 25, 26, 27) is mounted on the Hframe and a motor 58 operates to drive the robot 57 along the rails 53. The robot 57 operates automatically to pick up a wheel 51 from a pile of wheels stored on one of the upper conveyor lines 38 and to transfer it to a location on the lower conveyor unit 42 (FIG. 18) or, when necessary, to perform the reverse action. The robot 57 has a base seat 59, and a robot arm assembly comprising a base 61, lower articulated joint 62, arm 63, mounting fork 64, and upper articulated joint 65. The articulated joints 62, 65 are automatically driven by actuators (not shown) to implement angular rotation about axes A, B, C and D (FIG. 25) leading to a corresponding movement of wheel gripper 66 which is mounted to the end of arm 63.

Figure 26:
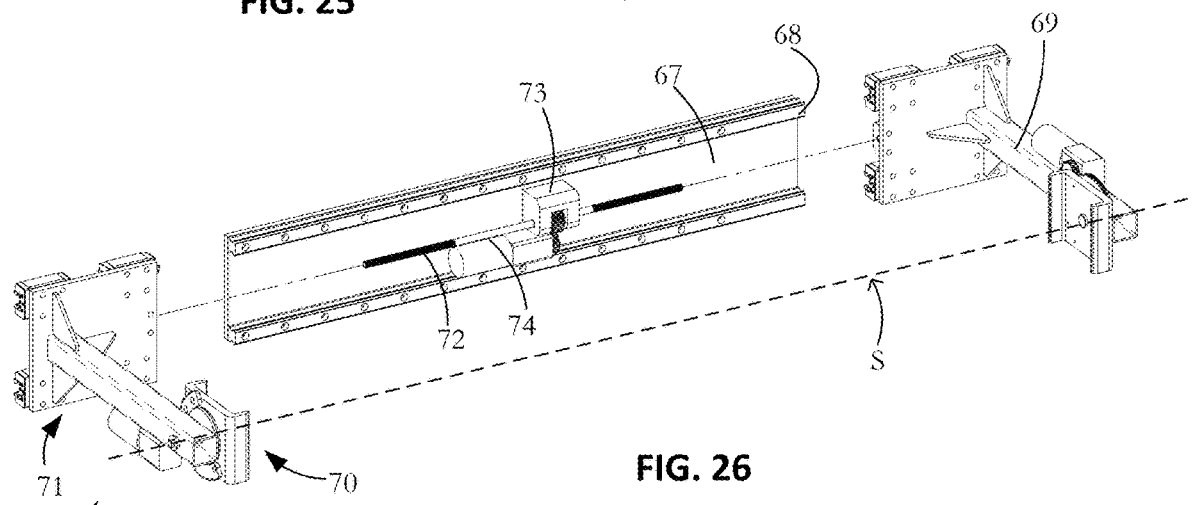
FIG. 26 is an exploded, perspective view from one side showing parts of a wheel gripper being part of the wheel pickup robot of FIG. 25.
Figure 27:
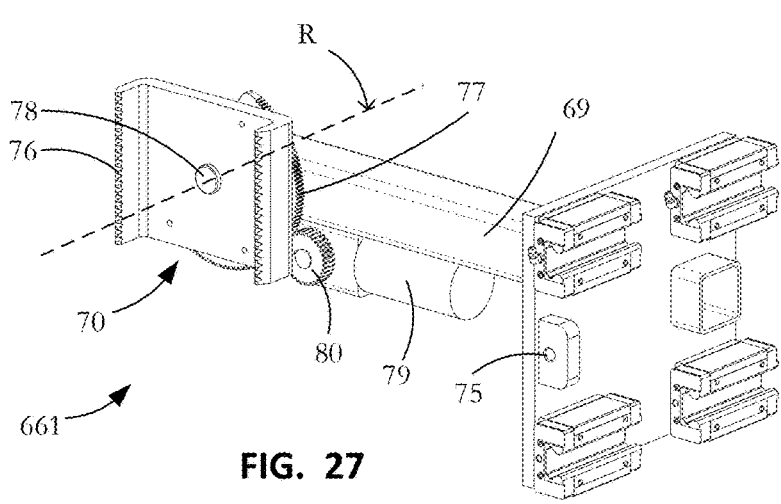
FIG. 27 is a perspective view from the other side showing part of the wheel gripper of FIG. 26.

Wheel gripper 66 is pivotably mounted to articulated joint 65 and is used to grip and manipulate a tired wheel about relatively orthogonally disposed axes C and D. The wheel gripper 66 has a base plate 67 on which are mounted linear guide rails 68 (FIG. 26). To each of a pair of frame members 69 are mounted a claw 70 and a linear carriage 71. The linear carriages 71 are mounted at opposed ends of the base plate 67 and are slidable along the rails 68 so as to change the spacing between claws 70. Also mounted on base plate 67 is a rod 72 with a left-hand thread on one end part and an identical pitch, right-hand thread on its distal end part. The rod 72 is held by block 73 fixed to the base plate 67 and an actuator 74 operates to rotate the rod 72. The left-hand threaded part of rod 72 screw engages apertured block 75 (FIG. 27) integral with one of the carriages 71. The right-hand threaded rod part screw engages a corresponding block integral with the other carriage. Rotation of rod 72 thus drives the blocks 75 to implement aligned linear movement of the claws along the direction S. This in turn causes linear movement of the claws 70 in opposite directions with the claws 70 being driven closer together to grip a wheel 51 or being driven further apart to release a held wheel.

Each claw is formed as a tooth edged U channel 76 and is pivotably mounted on a respective one of the frame members 69. A plate 77 with gear teeth on an outer round edge is fixed to U-channel 76 with the center of curvature of an outer arcuate edge part thereof aligned with pivot shaft 78. An actuator 79 having an integral pinion 80 is fixed to the frame member 69 so that the pinion 80 engages with geared plate 77. In this way, toothed U-channels 76 of both claws 70 can rotate relative to base plate 67 about axis R driven by actuator 79. With appropriate control, actuators 79 are operated to synchronously, angularly rotate the claws so as to rotate a wheel held between the claws 70 as if the claws were mechanically connected.

Figure 28:
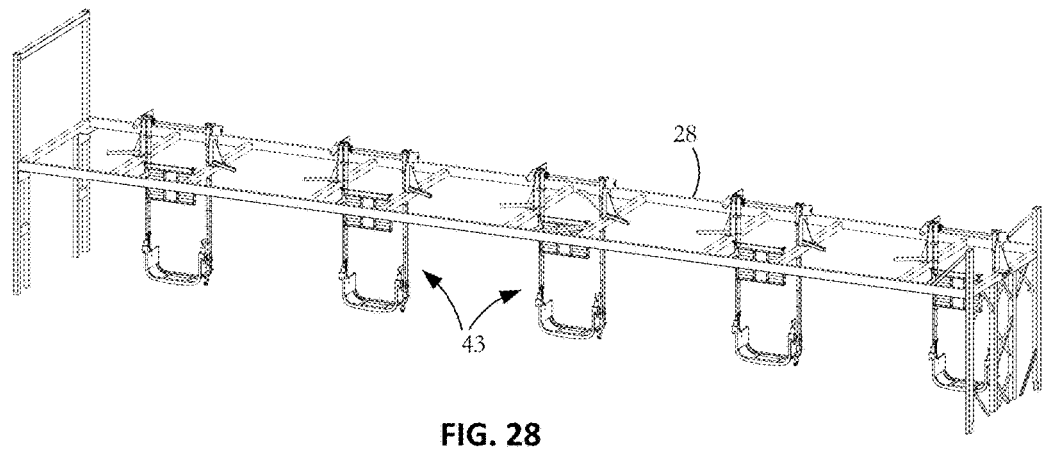
FIG. 28 is a perspective view of wheel elevator units mounted on the main frame according to an embodiment of the invention.
Figure 29:
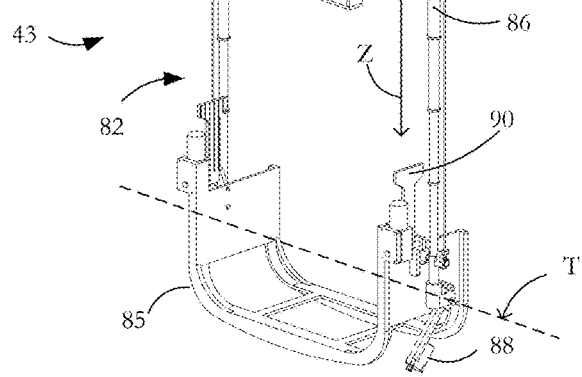
FIG. 29 is a perspective view of a wheel elevator unit according to an embodiment of the invention with basket in a lower position and swing conveyor in a parked position.
Figure 30:
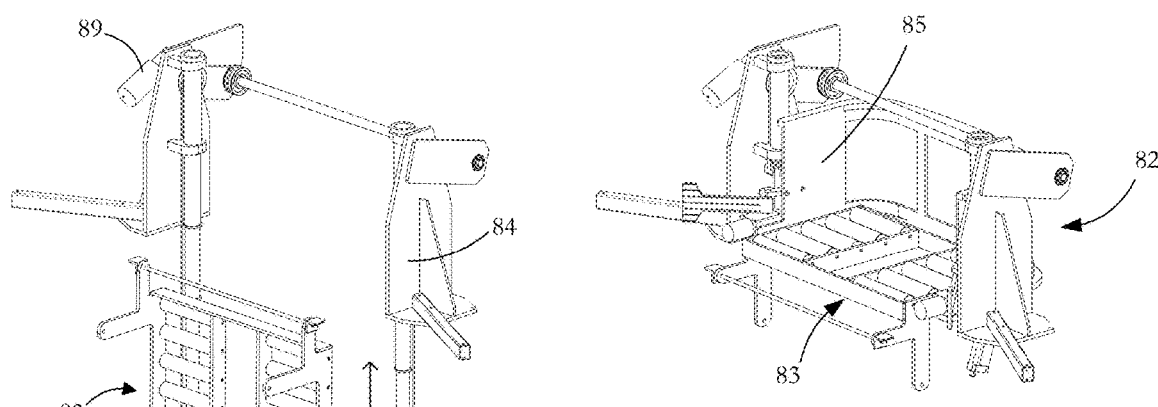
FIG. 30 is a perspective view of part of the wheel elevator unit of FIG. 29, the swing conveyor in a deployed position and the basket laid on the swing conveyor.

Wheel elevator units 43 are mounted on the frame 28 in positions corresponding to the positions of respective hallways 12 (FIG. 28). Each unit 43 (FIGS. 29-35) comprises an elevator 82 and a swing conveyor 83 and operates automatically to transfer a wheel from a lower position in a hallway 12 up to the height of the lower conveyor unit, or to transfer a wheel in the opposite direction. The elevator 82 has support members 84 fixed to frame 28 and a C-form basket 85 to contain and convey the wheel. In this specification, the terms "basket" and "cage" are used interchangeably. The sides of the basket 85 are mounted to respective support members 84 by vertically oriented, telescopic rods 86. The upper end of each rod 86 is fixed to a respective support member 84 so that basket 85 can slide telescopically up and down along vertical axis Z. Each rod lower end 87 is pivotally attached to a respective basket side and an actuator 88 operates to drive the basket 85 to rotate 90 degrees about horizontal axis T. An upper actuator 89 operates to pull the basket 85 upwardly along axis Z through a set of conventional transmission components such as sprockets, pulleys, shafts and wire ropes. When the actuator 89 releases, the basket 85 falls under gravity to the bottom position. The wheel elevator unit 43 is therefore operable to move a basketed wheel vertically up and down and to manipulate the wheel basket and its contained wheel between vertical (FIG. 29) and horizontal (FIG. 30) orientations.

Holding bars 90 are pivotably mounted to the basket 85 at its open side. When a wheel 51 is loaded into the basket 85, the holding bars 90 are angularly rotated towards the wheel so that the bar ends contact and press against the wheel to hold it in the basket. In another part of the procedure, the holding bars are driven in reverse to release the wheel.

The swing conveyor 83 has shaft 91 pivotally mounted to frame 28 and can be swung about the shaft axis by actuator 881 (not shown) between the operational and parked positions. In the parked position, the swing conveyor 83 is vertically orientated so that unobstructed vertical movement of the basket 85 can take place.

The swing conveyor 83 is moveable between an operational position (FIG. 30 to 32) and a parked position (FIG. 29, 33-35). In the operational position, the conveyor 83 is in a horizontal laid down status, and located immediately next to the turning conveyor 45 (FIGS. 31, 32), and coplanar with it. Before the transfer, the basket 85 is horizontally positioned on the turning conveyor 82 with the holding bars 90 in the open position. This conveyor configuration is adopted when a wheel 51 is to be transferred in a horizontal position from the turning unit conveyor 45 into the basket 85, or vice versa. Movement of the wheel 51 into or out of the basket 85 is achieved by drives from both rollers of turning conveyor 45 and rollers of swing conveyor 83.

Figure 31:
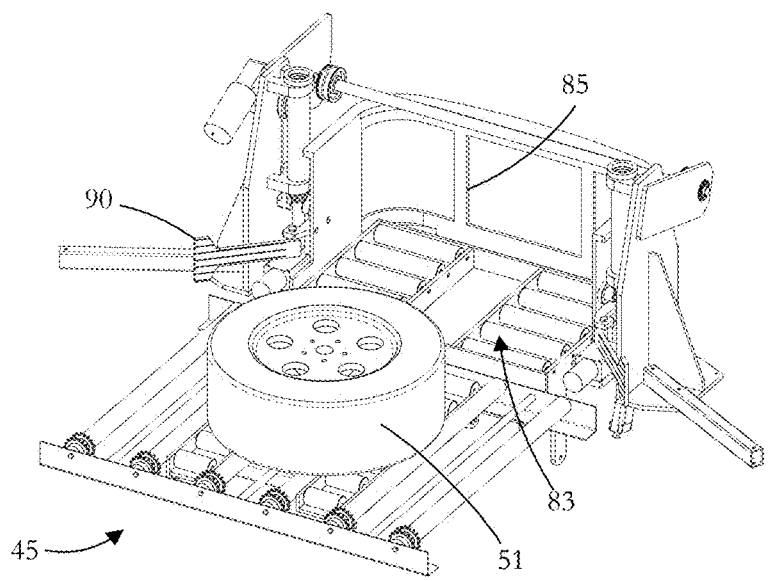
FIG. 31 to FIG. 35 show the steps in the procedure, using a wheel elevator, for transferring a wheel from an upper horizontal turning conveyor down to a lower position.
Figure 32:
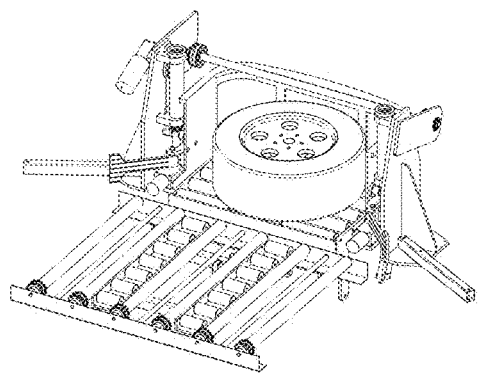
Figure 33:
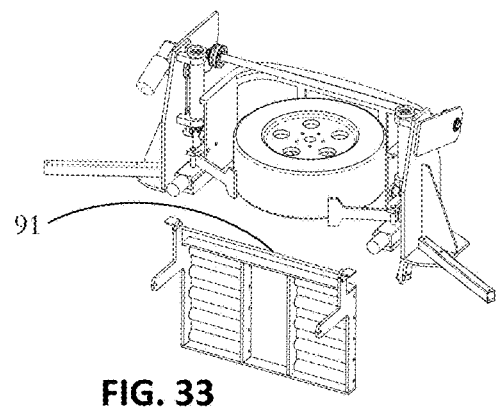
Figure 34:
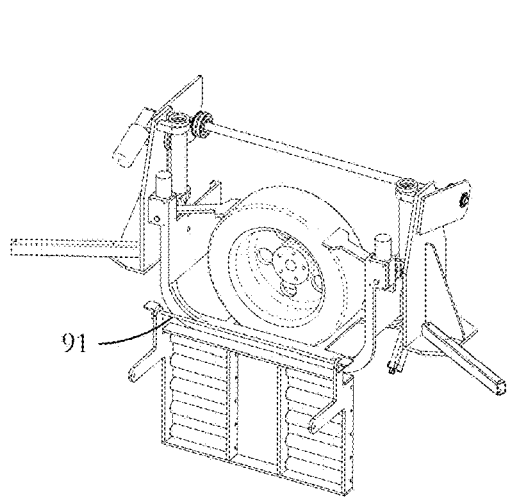
Figure 35:
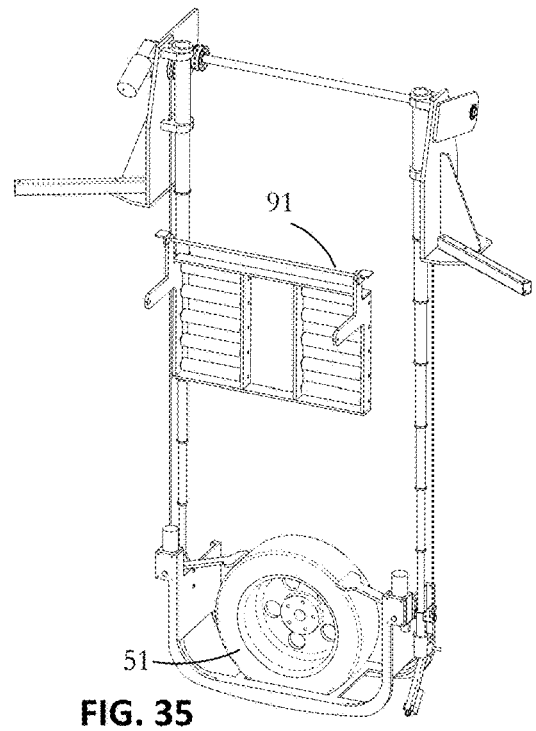
Figure 36:
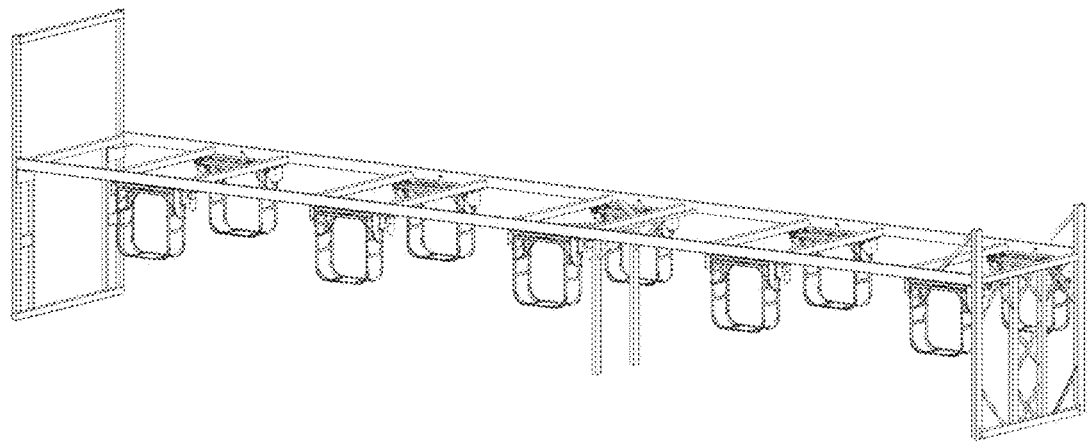
FIG. 36 shows a main frame mounted with wheel buffer/flipper units according to am embodiment of the invention.
Figure 37:
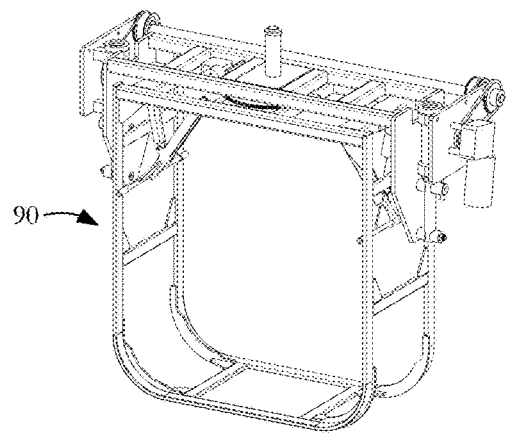
FIG. 37 shows in greater detail one of the wheel buffer/flipper units of FIG. 36.
Figure 38:
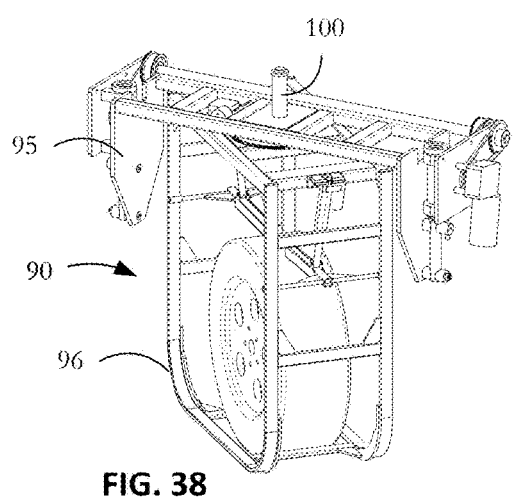
FIG. 38 shows a wheel being carried and flipped in the cage of the wheel buffer/flipper unit of FIG. 37.

As shown in FIG. 32 to FIG. 36, the detailed procedure for transferring a wheel 51 from turning conveyor 45 down to a position in hallway 12 is as follows:

1. A wheel 51 is positioned on turning conveyor 45 and rests on its rollers 48 (FIG. 31).
2. Elevator basket 85 moves up to top position with its opening facing up.
3. Basket 85 rotates to its horizontal orientation with its opening facing turning conveyor 45.
4. Swing conveyor 83 rotates to its horizontal orientation (FIGS. 31, 32).

5. The wheel 51 is driven by turning roller 48 to move toward and onto swing conveyor 83 (FIG. 32).
6. Basket rollers bring the wheel completely into the basket 85 (FIG. 32).
7. Holding bars 90 move to positions where they reliably hold the wheel 51 in the basket 85 (FIG. 33).
8. Swing conveyor 83 rotates to a vertical orientation to provide space for vertical movement of basket 85 (FIG. 33).
9. Basket 85 rotates 90 degrees to reduce its area aspect for downward movement and to bring wheel to a vertical orientation (FIGS. 33, 34).
10. Actuator 89 rotates to release basket 85, gravity drags basket 85 and its contained wheel down to desired height (FIG. 35).
11. Holding bars 90 open to enable wheel pick up.
12. The reverse procedure is used to transfer a wheel from a hallway 12 up to turning unit 45.

FIGS. 37 to 40 show a wheel buffer/flipper unit 93 used to improve spatial efficiency in a hallway to facilitate the exchange of new and old wheels and the attachment and detachment of wheels to and from a vehicle. The wheel flipper function is used directly to flip a contained, buffered (i.e., temporarily stored) wheel about a vertical axis to a desired orientation without using the servicing robot. The requirement to the orientation of a wheel contained in the wheel buffer/flipper unit is, when the robot subsequently picks up the wheel for attaching to a vehicle wheel bearing, it will be in a desired orientation with the side of the wheel rim which is to contact the wheel bearing faces away from the robot and towards the bearing.

Figure 39:
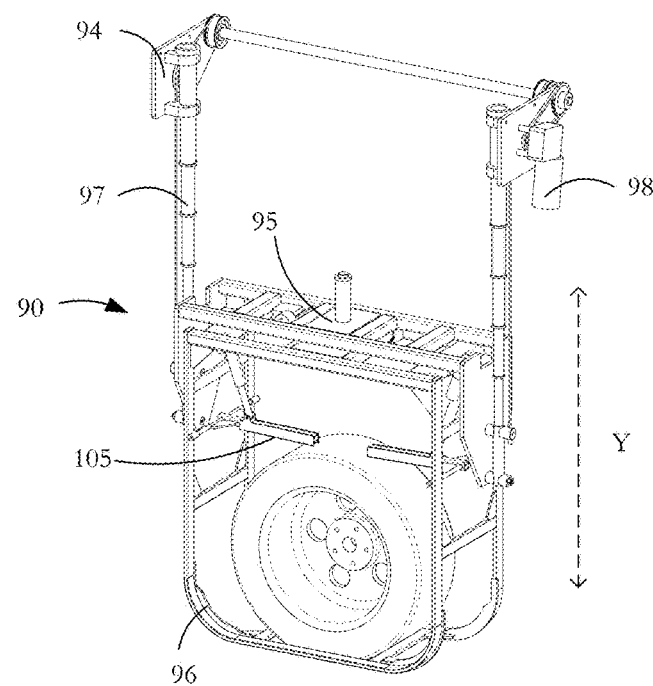
FIG. 39 shows a wheel being carried and lowered in the cage of the wheel buffer/flipper unit of FIG. 37

Buffer/flipper unit 90 is similar in some respects to wheel elevator unit 81. It has mounting plates 94, carrier 95, cage 96, vertical telescopic rods 97, actuator 98 and other structural and transmission parts. The mounting plates 94 are fixed to frame 28 and upper ends of each vertically extending telescopic rod 97 is fixed to plates 94. Lower ends of the telescopic rods 97 are fixed to respective sides of carrier 95 enabling the carrier to automatically slide up and down along a vertical axis Y (FIG. 40), carrier movement being driven by actuator 98. When actuator 98 releases, carrier 95 drops with cage 96 under gravity to a desired position. A vertically extending sleeve 100 is fixed at the center of carrier 95, and an actuator 101 with pinion 102 (FIG. 19B) attached to its underside is fixed beside sleeve 100. A shaft 103 and a sector gear 104 are concentrically mounted on top, and at the center, of cage 92 (FIG. 19A). Shaft 103 is mounted within sleeve 100 with its upper end blocked by a thrust bearing and fastener so that cage 96 is retained in carrier 95 and can rotate about the axis of sleeve 100. Pinion 102 (FIG. 19B) engages with sector gear 104 to rotatably drive cage 96 about axis Y (FIG. 39).

Holding bars 105 are pivotally mounted on each side of cage 96 and are angularly rotated by actuators 106 to press and hold a wheel 51 in cage 96, or are angularly rotated in a reverse direction to release a held wheel.

Operation of buffer/flipper unit 90 to ascend or descend is as follows:
1. Cage 96 descends to a bottom position with holder bars 105 opened up.
2. Wheel 51 is moved into cage 96, and holding bars 105 close to secure the wheel.
3. Cage 96 with contained wheel is moved up as desired.
4. When a wheel is needed, cage 96 brings the wheel down to a bottom position.
5. Servicing robot holds caged wheel and holding bars 105 are opened.

Operation of buffer/flipper unit 90 to rotate or flip a contained wheel is as follows:
1. Cage 96 rotates about center vertical axis Z driven by actuator 101 when cage 96 is at desired height.
2. Cage 96 and contained wheel rotate 180 degrees.
3. Carriage 95 and wherein attached cage 96 and contained wheel are moved down to desired height.
4. Servicing robot holds caged wheel and holding bars 105 are released.

The servicing station operates automatically under software control in the controller with control instructions for powered actuators and the like generated locally or remotely. Controller and power supply units operate to exchange data and commands with external and internal environments, and distribute power to actuators and the like. The primary control and power supply units of the controller are housed in a main control box at the back end of frame 28 above the rear chassis wheels. A sub-control box is located in each hallway 12. The other power supply units are placed at suitable positions in the frame 28.

The primary control box receives commands and data from an external environment and (a) generates and sends corresponding detailed data and commands to the sub-control boxes or directly to items of internal equipment, and (b) supplies or distributes power to internal equipment and actuators.

Primary control box also sends data to the external environment so that, for example, the history of an attached wheel and/or wheel receiving vehicle are trackable. The data may include any or all of maintenance/service records of a serviced vehicle, ID information of a wheel, ID and mileage of the vehicle to which a wheel is attached, tire tread images for a detached or attached wheel, wheel balancing data, etc.

Sub-control boxes receive commands and data directly from the primary control box, and in response, generate and send detailed data and control signals to internal equipment. Sub-control boxes 202 distribute power supply to internal equipment and send data to the primary control box. Other components are optionally used for control and power supply, such as sensors, actuators, wires, valves, etc. The sub-control boxes are mounted at suitably convenient positions within the station.

The controlling system can involve computer hardware, software, memory and other storage, and communications paths such as wired or wireless links and networks. Power supplies for the servicing states may include but are not limited to any and all of AC and DC electrical power, compressed air, hydraulics, etc., or any combination thereof. Power sources can be batteries or power generators located inside the servicing station using any suitable fuel. Alternatively or additionally, power is supplied from the external environment.

Other components and accessories used in the servicing station can include, but are not limited to, any and all of generators, air compressors, hydraulic pumps, containers for fuel or other liquids, lights, communication devices, security guard devices such as video cameras, and office equipment for a servicing station having an internal office. In one embodiment, any of cameras, scanners, sensors, and subsidiary robots are installed on or below floor to check the state of vehicle undersides or to perform automated repair or maintenance. Further components, accessories or equipment are conveniently placed on device trays mounted in the open areas next to the lower conveyor in line with the bays. If an office is needed, in one embodiment, it is located at space area at the back end of the servicing station, with doors and windows being installed to service the office.

The illustrated servicing station, especially if it has more than one bay, can be used to service multiple vehicles simultaneously. For example, wheel servicing for a vehicle, such as detaching/attaching wheels to a vehicle, can be executed in parallel in the hallway on both sides of the bay, or vehicle repairing work can be carried out from all the hallways beside active bays containing respective vehicles. However, some servicing cannot be executed in parallel due to the configuration of equipment and resources. For example, if only one or two service robots are operating in a hallway and there are vehicles on both sides of the hallway, there are four wheels requiring service but only two wheels can be serviced. In practice or as a result of deliberate scheduling, for the equipment or mechanism that can provide services to only one work object at the same time, the entrance of different vehicles should be properly scheduled to prevent vehicles from entering adjacent bays at the same time, so that each vehicle can use such equipment in sequency, to prevent parallel servicing actions that requesting for such equipment at the same time, therefore, reasonable efficiency is achieved. For example, in one hallway, a critical equipment servicing robot may be detaching/attaching wheels of a vehicle in a first bay while another vehicle may be in the process of entering the adjacent bay and being serviced by non-critical equipment such as hoists, conveyors, buffers, elevators, etc.

Figure 41:
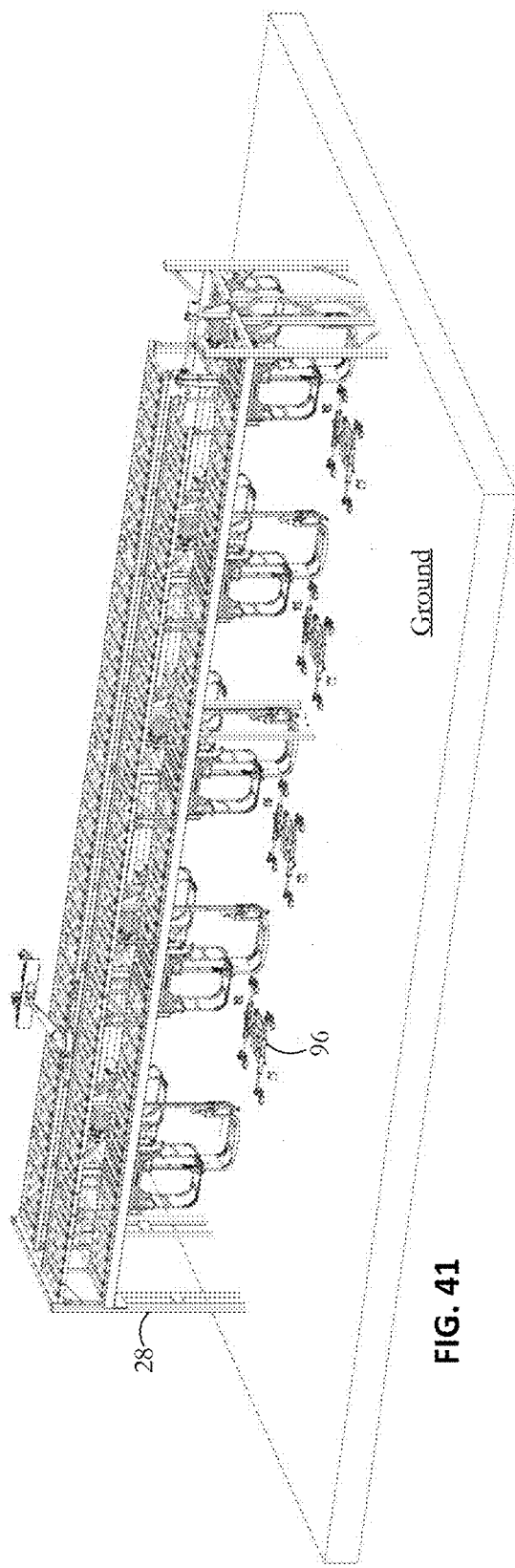
FIG. 41 is a perspective view showing another embodiment of the vehicle automatic servicing station, stripped of chassis and ramps, and mounted on the ground.

As shown in FIG. 41, a benefit of the servicing station is that it can be towed from site to site and set up to service local vehicles. One sequence for servicing station dismantling and transport and reassembly is as follows:

1. Secure wheels for use in future servicing or present from previous servicing (or clear out).
2. Tie and secure internal robots, components, etc.
3. Nest/stow ramps.
4. Lower roof front end.
5. Deploy chassis landing stand.
6. Nest automatic powered stands.
7. Engage tractor unit saddle chassis king pin.
8. Nest chassis landing stand.
9. Tow servicing station to new location with said tractor unit.
10. Reverse 1-9 for assembly.

In another embodiment (FIG. 23), the frame and all contents are detached and removed from the chassis and the frame is anchored to the to the ground to form a fixed servicing station. The servicing station frame 28 and hoists 13 are directly mounted and fixed on the ground G and all chassis components including the floor, ramps, chassis axle and wheels, etc., are removed. The fixed servicing station has much the same functionalities as the presently preferred transportable station, except that it cannot be easily towed by a tractor unit to move it to another service location. In a variation of the above embodiment, the base of frame is fixed onto a platform and the platform is either fixed to the ground or with suitable clamping arrangement is transported on a flat-bed truck.

While the illustrated embodiments of the invention show the use of the aspects of the invention with servicing a vehicle in terms of components that are wheels, these same aspects can be adapted to other components including tools. In one embodiment, the components used in automated servicing of a vehicle are other wheel parts such as brake rotors or brake pads and a mobile robot used in the servicing hallway has mechanisms adapted for automated removal of such components. In another embodiment, the components (including tools) have nothing to do with wheels. For example, the components are new windshields and a mobile robot that removes old windshields and installs new windshields, including effecting subsidiary sealing processes and using tools for such removal and installation. In a further embodiment, an item such as a component or tool is placed and anchored in a standard container such as a cage or box or is placed and held by a standard holder. The container or holder is then handled and maneuvered in much the same way as the caged wheel of the illustrated embodiments. Thus, for example, the container or holder is transferred from an upper storage deck to a hallway, either directly or via an intermediate access deck or position. After the container or holder is moved into the target hallway, a mating fixture on a mobile servicing robot picks up the item and, in the case of a tool, applies the tool to the vehicle being serviced or, in the case of a component, replaces the old component on the vehicle with the component from the container or holder. Empty containers/holders are transferred out of the servicing station using adaptations of the previously described holding and transfer mechanisms.

In the embodiments previously described and illustrated, the movement of a wheel once it has entered the apparatus involves two stages: a hold and transfer from a first, top conveyor deck to a second lower conveyor deck and then movement of the wheel from a position on the second lower conveyor deck to a service hallway. A two decks structure is adopted because it is convenient to effect the movement of a wheel in two stages from the viewpoint of limited space, other requirements in the wheel movement sequence, operational efficiency. However, it will be understood that a single deck overlying the bays and hallways may be sufficient to effect required wheel movement. Also, in the embodiments previously described and illustrated at each of the decks there is a wheel holding and a wheel downward transfer mechanism. In those embodiments, it is convenient but not essential that wheel holder designs and operations differ from one another, and that the wheel downward transfer mechanisms differ from one another. Specific design is to serve the purposes of adapting to limited space, wheel situation at each deck, particular movements required and operational efficiency. However, with some modification, the holder designs can be swapped or replaced by another wheel holder design and the transfer mechanisms can be swapped to replaced by another wheel transfer design.

Other variations and modifications will be apparent to those skilled in the art and the embodiments of the invention described and illustrated are not intended to be limiting. The principles of the invention contemplate many alternatives having advantages and properties evident in the exemplary embodiments.

The invention claimed is:

1. Apparatus for use in robotic servicing of a vehicle, the apparatus comprising:
a frame having a height, width and length, wherein the length is longer than said width, the frame having a bottom deck, a top of the bottom deck is laid out as at least one bay area for receiving the vehicle whose driving direction is parallel to a width direction of the frame, and at least one hallway area adjacent the bay area on at least one of a left side and a right side of the bay area, the hallway area is configured to accommodate a first automated robot configured to operate on at least a portion of the vehicle for servicing the vehicle, and provide space for movement of the first automated robot, the frame having an upper deck located above the bottom deck for placement of components when servicing the vehicle, at least one rail mounted on the frame along a length direction of the frame for providing support for longitudinal movement of a second automated robot operable to pick up the component;

a first cage in the hallway area as a first holder for the component, a first drive for altering a height of the first cage, and a second drive for rotating the first cage between a cage-vertical position and a cage-horizontal position; and a middle deck located between the bottom deck and the upper deck, wherein the middle deck has at least one middle conveyor for moving the components along the frame, said at least one middle conveyor is divided into multiple middle conveyor cells;

wherein the upper deck has at least one upper conveyor for moving the components along the length of the frame, said at least one upper conveyor is divided into multiple upper conveyor cells.

2. The apparatus claimed in claim 1, wherein each of the multiple upper conveyor cells are operable independently of one another.

3. The apparatus claimed in claim 2, wherein each of the multiple middle conveyor cells are operable independently of one another.

4. The apparatus claimed in claim 1, further comprising a turning conveyor below at least one of the middle conveyor cells on the middle deck.

5. The apparatus claimed in claim 4, further comprising a third drive configured to raise said turning conveyor to a height higher than a respective one of the middle conveyor cells for driving the component above said one of the middle conveyor cells to move in a lateral direction, and to lower said turning conveyor to a height lower than said one of the middle conveyor cells for driving said component to move in a longitudinal direction.

6. The apparatus claimed in claim 5, further comprising a lateral bridging conveyor with one end hinged to the frame, the bridging conveyor is next to and aligned with the raised turning conveyor in conveying direction and height a fourth drive operable to swivel said bridging conveyor between a vertical orientation and a horizontal orientation, said bridging conveyor is rotated to a horizontal position below the first cage after said first cage is changed from a cage-vertical position into a cage-horizontal position, thereby the turning conveyor and the bridging conveyor are operable to transfer the component in lateral direction between the first cage and the respective middle conveyor cell.

7. The apparatus claimed in claim 6, further comprising a second cage located in the hallway area as a second holder for temporarily holding the component, and a fifth drive for altering a height of the second cage.

8. The apparatus claimed in claim 7, further comprising a sixth drive for angularly rotating the second cage about a vertical axis whereby to flip relative positions of an outer face and an inner face of the second cage.

9. The apparatus claimed in claim 8, the first automated robot is an automated robot with gripper tool for gripping the component, said gripper tool comprises a plurality of grippers mounted on a plate and gripper drives to adjust a separation distance between the grippers to grip and release the component, the robot and gripper tool are configured to move the component in the hallway area, said first automated robot and said gripper tool are operable to transfer the component between any two locations of a first wheel hub of the vehicle, a second wheel hub of the vehicle, the other portion of the vehicle, the first cage, and the second cage.

10. The apparatus claimed in claim 9, wherein the first automated robot is a wheel servicing robot the component is at least one of a wheel, a part of the vehicle other than the wheel, and a tool.

11. The apparatus claimed in claim 1, wherein the second automated robot comprises a robot arm with a component gripper on the end of a robot arm wrist, said robot arm sits on a base frame with rollers which sitting on said rail, a seventh drive operable to move said robot arm longitudinally along the rail, said component gripper comprises a plurality of carriages mounted on a plate and a carriage drive to adjust a separation distance between the carriages to grip and release the component, said robot arm and component gripper are operable to transfer the component between the upper deck conveyor and the middle deck conveyor.

12. The apparatus claimed in claim 9, wherein the middle deck has two middle conveyor lines extending longitudinally, side-by-side and separated by a first space therebetween, and the upper deck has two upper conveyor lines extending longitudinally, side-by-side and separated by a second space therebetween, the first cage is mounted in the hallway area and between said two middle conveyor lines, the first cage is configured to transfer the component between the bridge conveyor and the location of the dropped down first cage, at least one end of the hallway area is mounted a second cage, each of the first cage and the second cage comprise a plurality of claws mounted on the respective cage frame and a claw drive to adjust a separation distance between the claws to grip and release the component.

13. The apparatus claimed in claim 11, wherein the top of the bottom deck is laid out as a plurality of the bay areas and a plurality of the hallway areas, each of the bay areas are configured for occupancy by a respective vehicle to be serviced, adjacent bay areas separated by a hallway area, the component loaded in a lowered first cage in one hallway area is operable to be transferred to another lowered first cage in another hallway area by at least one of the respective first cages, the bridging conveyors, the turning conveyors and of the middle conveyor cells.

14. The apparatus claimed in claim 1, further comprising a wheeled chassis under the bottom deck to support the frame.

15. The apparatus claimed in claim 14, wherein the chassis has rear wheels and anyone of a king pin and a front hitch, the frame having a roof, the roof hinged at a back end of the frame and pivotable between a first operational angle for vehicle servicing where the roof is parallel to the top of the bottom deck, and a second, transportation angle in which the roof is hinged downwardly so that a front end thereof is closer to the top of the bottom deck than the hinged back end of the roof.

16. The apparatus claimed in claim 14, further comprising a ramp mounted at a first hinge at one side of the bottom deck top, a ramp drive is operable to swivel the ramp between a servicing orientation in which the ramp connects the top of the first deck and the ground at said one side of the frame, and a transportation orientation in which the ramp is in a generally vertical orientation.

17. The apparatus as claimed in claim 16, wherein the ramp comprises a bridge part and a flat part, the bridge part joined to the flat part at a joint, in the servicing orientation the bridge part having an end remote from the joint for ground contacting, and the flat part having an end remote from the joint connected at the first hinge, in the servicing orientation the flat part and the top of the bottom deck being coplanar.

18. The apparatus as claimed in claim 17, wherein the joint is provided by a ramp hinge, the apparatus further comprising a member fixed to one of the bridge part and the flat part, the member having a free end located in a gap under the other of the bridge part and the flat part to permit limited movement of the free end about the ram hinge axis, the movement having a vertical component.

19. The apparatus as claimed in claim 18, further comprising a pair of onramps and a pair of off-ramps at the site of each bay area, the ramps when deployed, enabling entry of the vehicle to be serviced from one side of the frame into said bay area and exit of the vehicle from said bay area after servicing from the other side of the frame.

20. The apparatus claimed in claim 1, wherein the upper conveyor is operable to move the component along the upper deck from an input end of the upper conveyor, and further operable to move the component to an output end of the upper conveyor.

21. The apparatus claimed in claim 11, wherein the second automated robot is a wheel pickup robot mounted on a frame base, the component gripper is operable to pick up at least one of a wheel, a part of the vehicle other than the wheel, and a tool.

22. The apparatus claimed in claim 1, further comprising a vehicle lifting robot mounted on the at least one bay area, said vehicle lifting robot is operable to lift the vehicle parked on the bay area to a designated height.

\* \* \* \* \*